(12) United States Patent
Berkowitz et al.

(10) Patent No.: US 6,513,084 B1
(45) Date of Patent: Jan. 28, 2003

(54) ARBITRATION OF STATE CHANGES

(75) Inventors: Brian T. Berkowitz, Seattle, WA (US); Peter A. Christofferson, Kenmore, WA (US)

(73) Assignee: Microsoft Corporation, Redmond, VA (US)

( * ) Notice: Subject to any disclaimer, the term of this patent is extended or adjusted under 35 U.S.C. 154(b) by 0 days.

(21) Appl. No.: 09/342,472

(22) Filed: Jun. 29, 1999

(51) Int. Cl.$^7$ .............................................. G06F 12/00
(52) U.S. Cl. ...................................................... 710/242
(58) Field of Search ................................. 710/200–244

(56) References Cited

U.S. PATENT DOCUMENTS

| | | | |
|---|---|---|---|
| 4,914,569 A | | 4/1990 | Levine et al. ............... 364/200 |
| 5,167,022 A | * | 11/1992 | Bahr et al. |
| 5,418,967 A | * | 5/1995 | Simcoe et al. |
| 5,794,034 A | * | 8/1998 | Harinarayan et al. |
| 5,832,508 A | | 11/1998 | Sherman et al. ............ 707/200 |
| 5,835,766 A | | 11/1998 | Iga .............................. 395/679 |
| 5,878,410 A | | 3/1999 | Zbikowski et al. ............ 707/2 |
| 6,029,177 A | | 2/2000 | Sadiq et al. ................. 707/201 |
| 6,240,479 B1 | * | 5/2001 | Snyder et al. |
| 6,249,846 B1 | * | 6/2001 | Van Doren et al. |

OTHER PUBLICATIONS

"TimesTen 3.7—In–Memory Database for 32–bit and 64–bit Operating Systems", TimesTen Performance Software, http://timesten.com/products/ttdatasheet.html, 11 p., (Jun., 1999).

"TimesTen In–Memory Data Management—Technical White Paper", Technical White Paper, TimesTen Performance Software, http://www.timesten.com/products/wp.html, 15 p., (2000).

* cited by examiner

*Primary Examiner*—John A. Follansbee
(74) *Attorney, Agent, or Firm*—Klarquist Sparkman, LLP

(57) ABSTRACT

When multiple nodes in a computer network perform work on a shared entity, such as a database record, an arbitration process is used to ensure changes made by more than one node to the same data is propagated to each of the nodes holding the shared entity and that the changes are applied in the same order on each of the nodes. An arbitration cycle for a particular entity is begun on a node ("instigator") when the node broadcasts a proposal message for a change to the entity to the other nodes or when the node ("observer") receives such a proposal message. Multiple nodes can be instigators during a single arbitration cycle. Each node that receives a proposal message sends a response message to the corresponding instigator. The arbitration cycle is closed to additional proposal messages after one instigator has received responses from all the nodes that share the entity. After each instigator node receives all the proposals in the arbitration cycle, it determines whether it is the winner of the arbitration cycle and broadcasts a closure message if it is. Each node determines an order in which to apply the changes proposed in the arbitration cycle when it knows it has received all the proposals in the arbitration cycle as determined by the sending or receiving of the closure message. Because each arbitration cycle is associated with a particular entity, multiple arbitration cycles associated with different items can be running concurrently in the network but multiple arbitration cycles for the same item must be executed serially. The arbitration process is executed even if there is only one proposal made in an arbitration cycle since the arbitration process enables the orderly propagation of changes across all the nodes that share the entity.

54 Claims, 17 Drawing Sheets

1600

| 1601 | ARBITRATED ENTITY ID |
|---|---|
| 1602 | ARBITRATION STATE |
| 1603 | NODES SENT PROPOSALS TO |
| 1604 | NODES RECEIVED RESPONSES FROM |
| 1606 | NODE EXPECTING PROPOSALS FROM |
| 1607 | NODES RECEIVED PROPOSALS FROM |
| 1608 | PROPOSALS IN CURRENT CYCLE |
| 1609 { 1610 | CLOSURE MESSAGE FOR CURRENT CYCLE |
| 1609 { 1611 | NODE THAT SEND CLOSURE MESSAGE FOR CURRENT CYCLE |
| 1612 | QUEUE OF UNPROCESSED PROPOSALS |
| 1613 | QUEUE OF ARBITRATED PROPOSALS |
| 1614 | STATE OF CURRENTLY EXECUTING NON-EXPEDITED PROPOSAL |
| 1615 | STATE OF CURRENTLY EXECUTING EXPEDITED PROPOSAL |
| 1616 | REFERENCE COUNT |

FIG. 16

ARBITRATION OF STATE CHANGES

FIELD OF THE INVENTION

This invention relates generally to distributed computer systems, and more particularly to arbitrating changes in state for entities shared among such distributed computer systems.

COPYRIGHT NOTICE/PERMISSION

A portion of the disclosure of this patent contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 1998, Microsoft® Corporation, All Rights Reserved.

BACKGROUND OF THE INVENTION

In a network in which multiple computers each process changes against the state of a shared entity, there must be a mechanism through which the computers cooperate when making the changes in such a way that all the computers come to the same decision about how the state should be changed. Locking and other synchronization primitives provide a way for multiple threads to coordinate changes to the same entity on the same computer. Across networked computers, however, some other synchronization mechanism is needed so that simultaneous changes to the same entity can be reconciled consistently by all the computers that share that object.

One previous solution to the problem designates a single computer in the network as a lock manager. The lock manager acts as a lock server to which the client computers in the network send their changes. The lock manager serializes the changes to ensure an orderly state change for shared entities. This solution is not entirely satisfactory. Not only is the lock manager a bottleneck in the processing of transactions through the network, but the computer acting as the lock manager must incorporate complex failsafe technology to prevent total shutdown of the network due to the failure of the lock server.

Other solutions focus on distributed locking protocols. A distributed locking protocol requires the implementation of a messaging protocol to handle the locking of the shared entity and to coordinate the changes among the computers so that the changes are applied in the proper order. While a distributed locking protocol does not rely on a designated computer to provide locking, only one computer in the network at a time manages the messaging protocol and so is subject to the same limitations as the lock manager solution.

Therefore, there is a need in the art for a mechanism that allows the distribution of the state change decision process among the interested computers, and which does not depend upon locking to ensure the proper ordering of the changes.

SUMMARY OF THE INVENTION

The above-mentioned shortcomings, disadvantages and problems are addressed by the present invention, which will be understood by reading and studying the following specification.

When multiple nodes in a computer network perform work on a shared entity, such as a database record, an arbitration process is used to ensure changes made by more than one node to the same data is propagated to each of the nodes holding the shared entity and that the changes are applied in the same order on each of the nodes. An arbitration cycle for a particular entity is begun on a node ("instigator") when the node broadcasts a proposal message for a change to the entity to the other nodes or when the node ("observer") receives such a proposal message. Multiple nodes can be instigators during a single arbitration cycle. Each node that receives a proposal message sends a response message to the corresponding instigator. The arbitration cycle is closed to additional proposal messages after one instigator has received responses from all the nodes that share the entity. After each instigator node receives all the proposals in the arbitration cycle, it determines whether it is the winner of the arbitration cycle and broadcasts a closure message if it is. Each node determines an order in which to apply the changes proposed in the arbitration cycle when it knows it has received all the proposals in the arbitration cycle as determined by the sending or receiving of the closure message. Because each arbitration cycle is associated with a particular entity, multiple arbitration cycles associated with different items can be running concurrently in the network but multiple arbitration cycles for the same item must be executed serially. The arbitration process is executed even if there is only one proposal made in an arbitration cycle since the arbitration process enables the orderly propagation of changes across all the nodes.

A particular implementation of the arbitration logic in conjunction with an in memory database that provides coherent caching among networked database client computers is disclosed.

The arbitration process of the present invention sends the changes as part of the messages required for synchronization and also provides for a much richer solution to the problem of asynchronous changes, e.g., rejecting certain changes, ordering changes, etc. depending on the type of entity being changed. Furthermore, a centralized lock service is not required as each computer in the network individually makes the determination of how to change the entity within its own cache.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

BRIEF DESCRIPTION OF THE DRAWINGS

FIG. 16 is a diagram of an arbitration object data structure for use in an exemplary implementation of the invention.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into five sections. In the first section, the hardware and the operating environment in conjunction with which embodiments of the invention may be practiced are described. In the second section, a system level overview of the invention is presented. In the third section, methods for an exemplary embodiment of the invention are provided. In the fourth section, a particular in-memory database system implementation of the invention is described. Finally, in the fifth section, a conclusion of the detailed description is provided.

Hardware and Operating Environment

Figure 1:
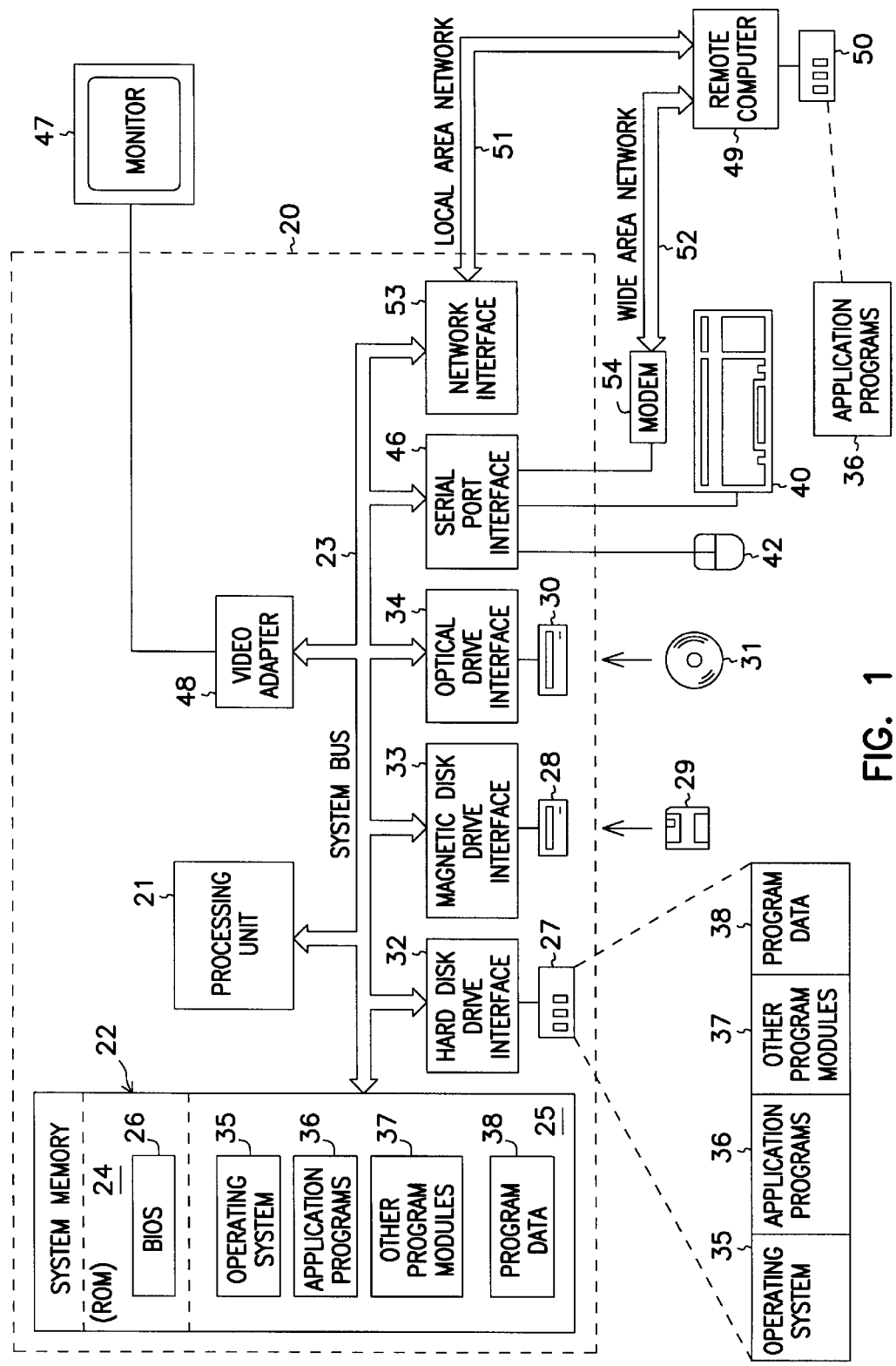
FIG. 1 is a diagram of the hardware and operating environment in conjunction with which embodiments of the invention may be practiced.

FIG. 1 is a diagram of the hardware and operating environment in conjunction with which embodiments of the invention may be practiced. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components, including the system memory 22, to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite-dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in offices, enterprise-wide computer networks, intranets and the Internet.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple to other computers.

System Level Overview

Figure 2A:
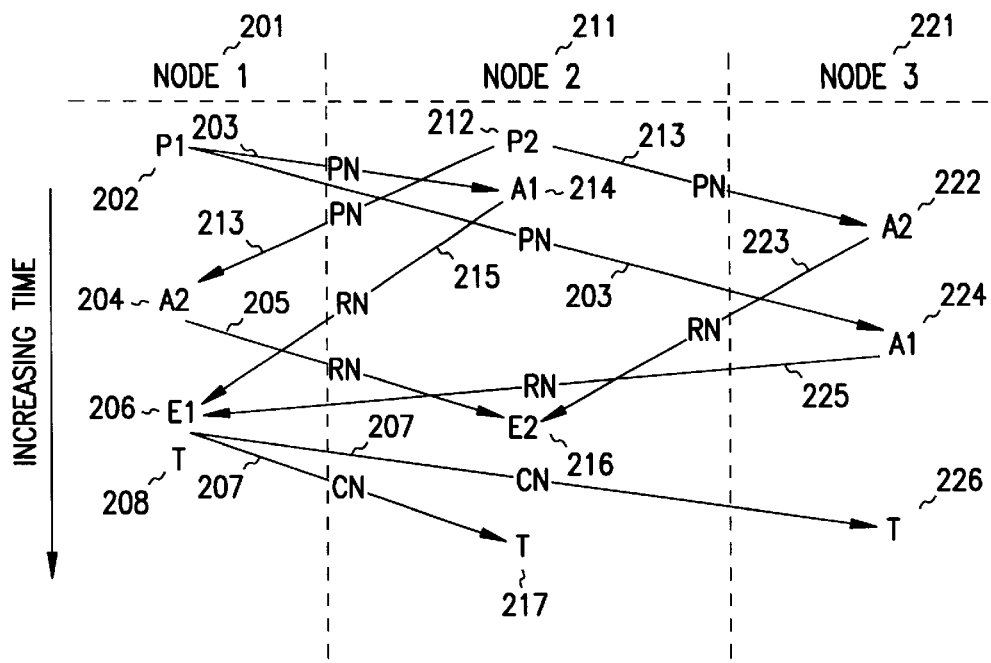
FIGS. 2A and 2B are diagrams illustrating a system-level overview of an exemplary embodiment of the invention.
Figure 2B:
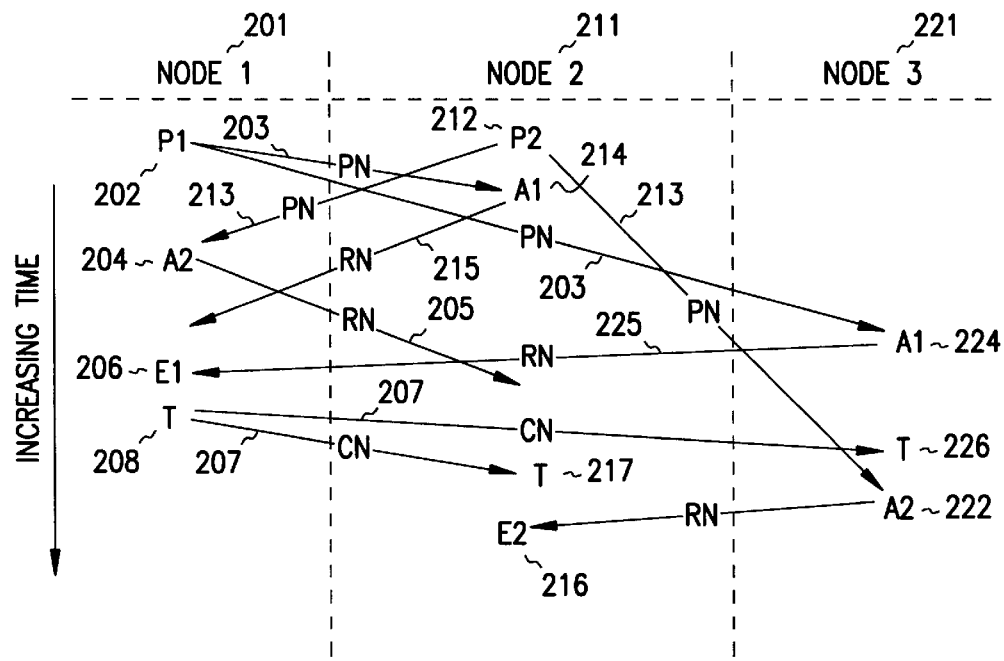

A system level overview of the operation of an exemplary embodiment of an arbitration process in accordance with the present invention is described by reference to FIGS. 2A and 2B. FIGS. 2A and 2B illustrate exemplary arbitration processes as performed by three computers, such as computer 20 or 49 in FIG. 1, that are peer nodes in a local area network, such as network 51. Nodes in the network that share at least one data entity are referred to a belonging to a "domain." The data entity can be an object, a record, a counter, or the like that is required to be distributed among nodes in the network. For example, a domain can consist of all the nodes in the network that are working on a particular table in a distributed database.

Because any number of the nodes in a domain can make simultaneous changes to the particular shared entity such that the state of the entity is changed, an arbitration process in accordance with the present invention is utilized to ensure the state change is orderly and to propagate the state changes to each node in the domain. An arbitration cycle within the arbitration process is comprised of a number of operations that perform orderly state changes on the entity such that at the end of the cycle all nodes agree on the new value for the entity. A cycle begins with one or more nodes making proposals to change the entity. It is complete when all proposals are either rejected or sequentially ordered, and for ordered proposals, values assigned. For a given entity, multiple cycles must be serialized within the arbitration process, thus only one arbitration cycle per entity is active or "current" at a time. With respect to different entities, multiple cycles can run concurrently.

All nodes that initiate a proposal on the entity during a particular cycle are designated as "instigators" in the cycle; all other nodes in the domain are "observers" in the cycle. Information during the arbitration cycle is exchanged among the instigators and observers through arbitration messages. To minimize arbitration message traffic among the nodes, the instigators and observers in the exemplary embodiment are able to independently and coherently decide on rejection and ordering of proposals through an common evaluation operation resident on each node as described below. The proper outcome from the common evaluation operation is dependent on messages being delivered from one node to another in the order in which they were sent.

The exemplary arbitration cycles illustrated in FIGS. 2A and 2B contain four types of operations and three types of messages. A proposal operation (P) is triggered by a request, such as from an application program, to a node in the domain to modify some data entity held by the node. The proposal operation begins a new arbitration cycle for the entity on the node and creates an arbitration data structure to manage the cycle on the node. Data records, tables, lists or objects are equally applicable for use as the arbitration data structure. For purposes of clarity, the arbitration data structure is referred to as an arbitration object hereinafter, but the invention is not so limited by such use.

The node multicasts a proposal notification, or proposal, message (PN) to the other nodes in the domain. The proposal operation also lists the proposal with the arbitration object. The arbitration object-maintains an list of all active proposals in the arbitration cycle, ordered on a proposal attribute such as time. Additional orderings are described below. If a proposal operation is triggered during an active arbitration cycle, the operation is blocked until the current cycle completes. The proposal operation designates the node as an "instigator" in the corresponding arbitration cycle.

A proposal can be to explicitly assign a value (such as an identifier for a database table) or a request to perform an operation (such as inserting, deleting or modifying a database record) that determines the new value of the entity upon completion of the arbitration. In the latter case the value is implicitly assigned when the proposal is ordered in the arbitration object.

An arbitrate operation (A) is triggered by the receipt of a proposal from another node. If there is no arbitration cycle for the particular entity on the receiving node, the arbitrate operation starts one and creates an arbitration object on the receiving node for the entity. The proposal is added to the list in the arbitration object on the node. The arbitrate operation concludes by sending a response notification, or response, message (RN) to the sender of the proposal.

If an arbitration cycle on a node is, started by an arbitration operation instead of a proposal operation, the node is an observer in the cycle. On observer nodes, the arbitrate operation performs further processing as described below in conjunction with the terminate operation.

An evaluate operation (E) is triggered on an instigator node when a response has been received for each proposal sent in the current arbitration cycle. The evaluate operation examines the arbitration object to determine the proposal in the current cycle against some pre-determined criteria to determine the proposal having the highest ranking. If the highest ranking proposal was initiated locally by this node, the local node is the winner of the arbitration and multicasts a closure notification, or closure, message (CN) to the other nodes in the domain and implicitly to itself. The closure message contains the list of nodes from which proposals were received, i.e., all the instigator nodes in the corresponding arbitration cycle. Optionally, the closure message contains the outcome of the evaluation operation, which specifies in which order to apply the proposals. When a common outcome decision process executes on each node, each node reaches the same result for a given arbitration cycle, so the optional information in the closure message is not necessary in this embodiment.

A terminate operation (T) is triggered by the receipt or sending of a closure message and must be initiated before the arbitration process can complete. The termination operation determines the ordering of the proposals for a loser instigator node or an observer node when a common outcome decision process is used. Upon completion of an arbitration cycle, the relevant information in the arbitration object is saved along with any optional outcome information sent in the closure message. The arbitration object is freed and another arbitration cycle on the corresponding entry can begin. Each node applies the changes to the entity in the order determined by the evaluation operation.

The termination operation itself is not always sufficient to terminate the arbitration cycle because the closure message is not guaranteed to be the last message that arrives in the cycle when more than two nodes are members of the domain.

Because of this, the evaluation and termination operations can occur in either order on an instigator node, so the termination operation saves the contents of the closure message for potential use in a later evaluation operation. The arbitration cycle completes when both the evaluation and termination operations have completed.

On an observer node, proposals sent by instigators that have lost the arbitration can arrive after the closure message from the winning instigator node. Only the winner's proposal message is guaranteed to arrive at the other nodes before the corresponding closure message. Furthermore, an observer node does not know how many instigators were in the arbitration cycle until the arrival of the closure message containing the list of instigators in the current cycle.

The termination operation determines if there is a proposal in the observer node's arbitration object for each instigator identified in the arbitration cycle. If there is, the cycle is complete. If the observer node is missing proposals from at least one instigator, the observer stores the corresponding node identifier(s) in the arbitration object. All subsequent proposals from other nodes trigger arbitrate operations but are otherwise queued until completion of the current arbitration cycle. During subsequent arbitrate operations, the observer node removes the associated node identifier from the arbitration object as the missing proposals arrive. Only when there are no more node identifiers in the arbitration object is the corresponding arbitration cycle complete.

FIG. 2A illustrates an example of the arbitration process resulting from two proposed changes to the same entity in a domain of three nodes. The operations and messages in the arbitration cycles for the arbitration process are shown in time-ordered sequence. Node1 201 initiates a proposal operation (P1) 202, which sends proposal message (PN) 203 to node2 211 and node3 221. At the same time, node2 211 initiates a proposal operation (P2) 212, which sends proposal message 213 to node1 201 and node 221. Corresponding arbitration cycles are begun on node1 201 and node 211 as part of the proposal operations.

Node2 211 receives the proposal message 203 from node1 202. Because node2 211 has not yet received responses to its proposal message 213, the proposal message 203 becomes part of the current arbitration cycle on node2 211. The receipt of the proposal message 203 triggers an arbitration operation (A1) 214 on node2 211, and as a result, node2 211 sends a response message (RN) 215 to node1 211.

Node3 221 receives the proposal message 213 from node2 211 before it receives the proposal message 203 from node1 201. The receipt of the proposal message 213 begins an arbitration cycle on node3 221 and triggers an arbitration operation (A2) 222. Node3 221 sends a response message 223 to node3 211.

Node1 201 receives the proposal message 213 from node2 211 and includes it in the current arbitration cycle because node1 201 has not yet received responses to its proposal message 203. The proposal message 213 triggers an arbitration operation (A2) 204 on node1 201, which causes node1 201 to send a response message 205 to node2 211.

Next in the sequence of events, node3 221 receives the proposal message 203 from node1 201, begins an arbitration operation (A1) 224, and sends a response message 225 to node1 201.

After node1 201 has received both response message 215 from node2 211 and response message 225 from node3 221, it begins an evaluation operation (E1) 206. The evaluation operation 206 determines node1 201 is the winner of the arbitration and sorts the proposals 203, 213 in an predetermined order based on the outcome of the evaluation. The evaluation operation creates and sends a closure message 207 to nodes2 211 and node3 221. The sending of the closure message triggers a terminate operation 208 on node1 201. At the completion of the termination operation 208, the arbitration cycle on node1 201 is complete.

The arbitration cycles on node2 211 and node3 221 are still active at the time the arbitration cycle 201 completes because neither has yet received the closure message 207.

Receipt of both the response messages 205, 223 on node2 211 triggers an evaluation operation (E2) 216. The evaluation operation 216, which uses the same factors as the evaluation operation 206 on node1 201, determines that node2 211 is the loser of the arbitration. The arbitration cycle on node2 211 remains active until the closure message 207 arrives from node1 201 and causes the termination operation 217 to execute. The arbitration cycle on node2 211 is now complete.

Because node3 221 is an observer node in the arbitration process, it cannot define a current arbitration cycle until it learns which proposals belong to which arbitration cycle through the receipt of the closure message 207 from node1 201. The closure message 207 triggers a termination operation 226 that determines all proposals in the current arbitration cycle have been received, orders them as a result of executing the common outcome decision process, and terminates the cycle.

FIG. 2B illustrates the same operations and messages, except that the time sequence is different. In FIG. 2B, node3 221 receives the proposal message 213 from node2 211 after the proposal message 203 and the closure message 207 from node1 201. Because the proposal message 213 is missing when the terminate operation 226 executes, the termination operation 226 cannot order the proposals and so the arbitration cycle on node3 221 is not terminated by the terminate operation 226. The arrival of the proposal message 213 triggers the arbitrate operation 222, which permits the termination operation 226 to properly order the proposals and terminate the arbitration cycle.

Similarly, the arbitration cycle for node2 211 does not terminate when the termination operation 217 is triggered by the arrival of the closure message 207. In this case, the evaluation operation 216 has not yet been performed because node2 211 has not received the response message 225 from node3 211. Once the response message 225 arrives, the evaluation operation 216 executes, and the arbitration cycle for node2 211 is complete.

Note that in both FIGS. 2A and 2B, no message from one node to another node arrives, or is processed, before a prior message from the same node. This restriction, referred to as the Notification Rule, is enforced by the strict, ordered delivery of messages within the network. If a node has more than one message from the same node in its message queue, the receiving node relies on ordering information supplied by the network to determine the order in which to process the messages.

The Notification Rule, working in conjunction with the rule that a proposal is included in an arbitration cycle for a node if it is received after that node has broadcast its proposal but before it received a response, ensures that the set of proposals for the current arbitration cycle are the same on all instigator nodes. Assuming that proposal 212 from node2 211 is included in the current arbitration cycle on node1 201, i.e., the arbitration cycle that started with instigating proposal 202 on node1 201. Then proposal 202 must be in the current arbitration cycle on node2 211 that includes proposal 212 because if proposal 212 is included in the current arbitration cycle on node1 201, then the response 215 to proposal 202 from node2 211 was received after proposal 212. Similarly since proposal 202 was sent from node1 201 before proposal 212 was received by node1 201 then the response 205 from node1 201 will be sent after proposal 202. Therefore node2 211 will receive the proposal 202, and response 205 in that order and as a result proposal 202 will be included in the arbitration cycle on node2 211. It is easy to see by induction that the current arbitration cycle on all instigator nodes includes the exact same set of proposals.

The system level overview of the operation of an exemplary embodiment of the arbitration process of the present invention has been described in this section of the detailed description. The arbitration process executes an arbitration cycle on each node in a network that shares an entity when a change is proposed to the entity by a node. In one embodiment, the arbitration cycle on each node determines the proper order in which to apply the changes upon termination of the arbitration cycle. In an alternate embodiment, the order is determined at the winning node and propagated to the other nodes. While the invention is not limited to any particular network configuration, for sake of clarity a simplified three node network has been described.

Methods of Exemplary Embodiments of the Invention

In the previous section, a system level overview of the operations of exemplary embodiments of the invention was described. In this section, the particular methods performed by a computer executing such exemplary embodiments are described by reference to a state diagram and a series of flowcharts. The methods to be performed constitute computer programs made up of computer-executable instructions. Describing the methods by reference to a state diagram or flowchart enables one skilled in the art to develop such programs including such instructions to carry out the methods on suitable computer (the processor of the computers executing the instructions from computer-readable media).

Figure 3:
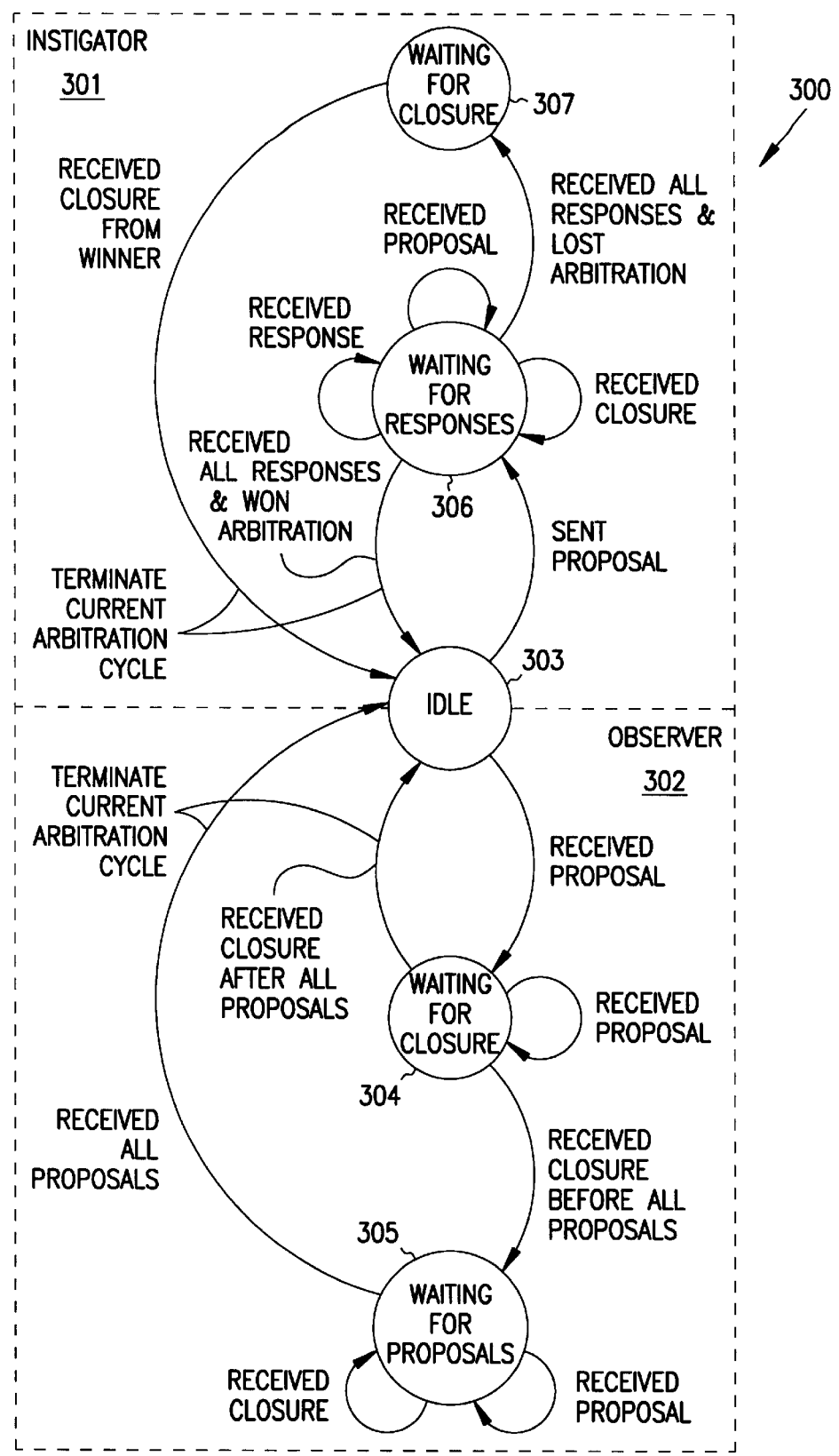
FIG. 3 is a state diagram for an exemplary embodiment of the invention executing on a computer.

FIG. 3 is a state diagram of the states of an exemplary embodiment of arbitration process 300 operating on a node, and illustrates the messages that cause changes in state of an arbitration object executing the process. FIGS. 4–12 are flowcharts of the methods executed by the arbitration cycle while in the states shown in FIG. 3. As described in the previous section, there is a single arbitration cycle for a particular entity active at any given time, but multiple arbitration cycles can be executing on a node when more than one entity is being changed. Thus, one of skill in the art will immediately perceive that FIGS. 3–12 illustrate multi-threaded computer programs. This section described the methods for the arbitration process as being implemented in an arbitration object, with one instance of the arbitration object per entity. Although, the terns "arbitration object" and "instance of an arbitration object" are used interchangeably, the meaning will be readily understood by one of skill in the art. Furthermore, one of skill in the art will readily recognize the proper interpretation of the term "state" through its application to either the arbitration object or to the data entity.

Referring first to FIG. 3, the arbitration object associated with a particular entity begins at an idle state 303 on a node (the "local" node). The creation of the arbitration object is described in conjunction with FIGS. 4 and 5 immediately below. The arbitration object transitions to a waiting for closure state 304 when the local node receives a proposal concerning the entity from another node in the domain (a "remote" node). The arbitration object processes all subsequent messages involving the entity as an observer 302 until the current arbitration cycle is terminated. The arbitration object transitions from the idle state 303 to a waiting for responses state 306 when the local node proposes a change to the entity. Under these circumstances, the arbitration object processes all subsequent messages involving the entity as an instigator 301 until the current arbitration cycle terminates.

Figure 4:
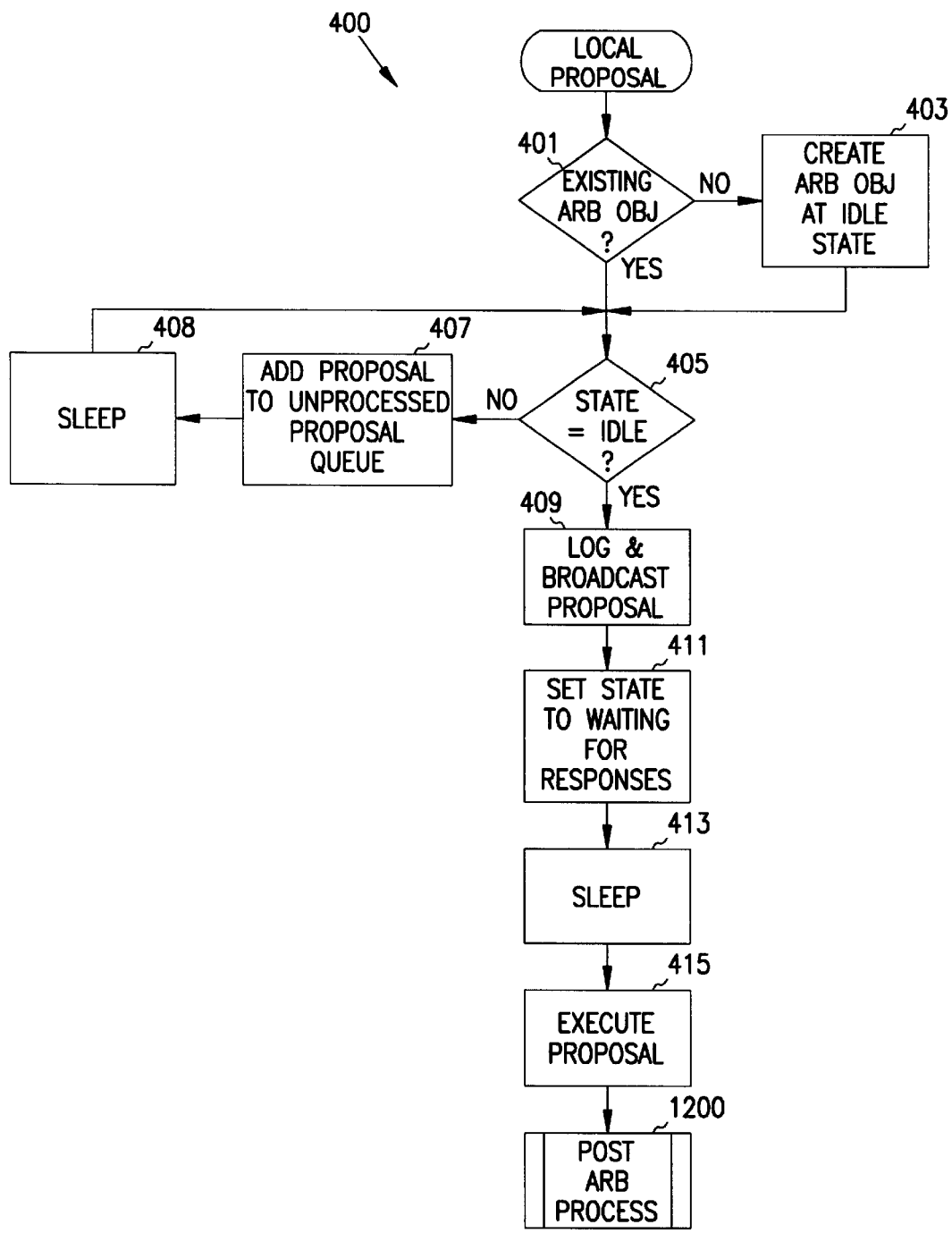
FIGS. 4, 5, 6, 7, 8, 9, 10, 11 and 12 are flowcharts of methods to be performed by the states shown in FIG. 3.
Figure 5:
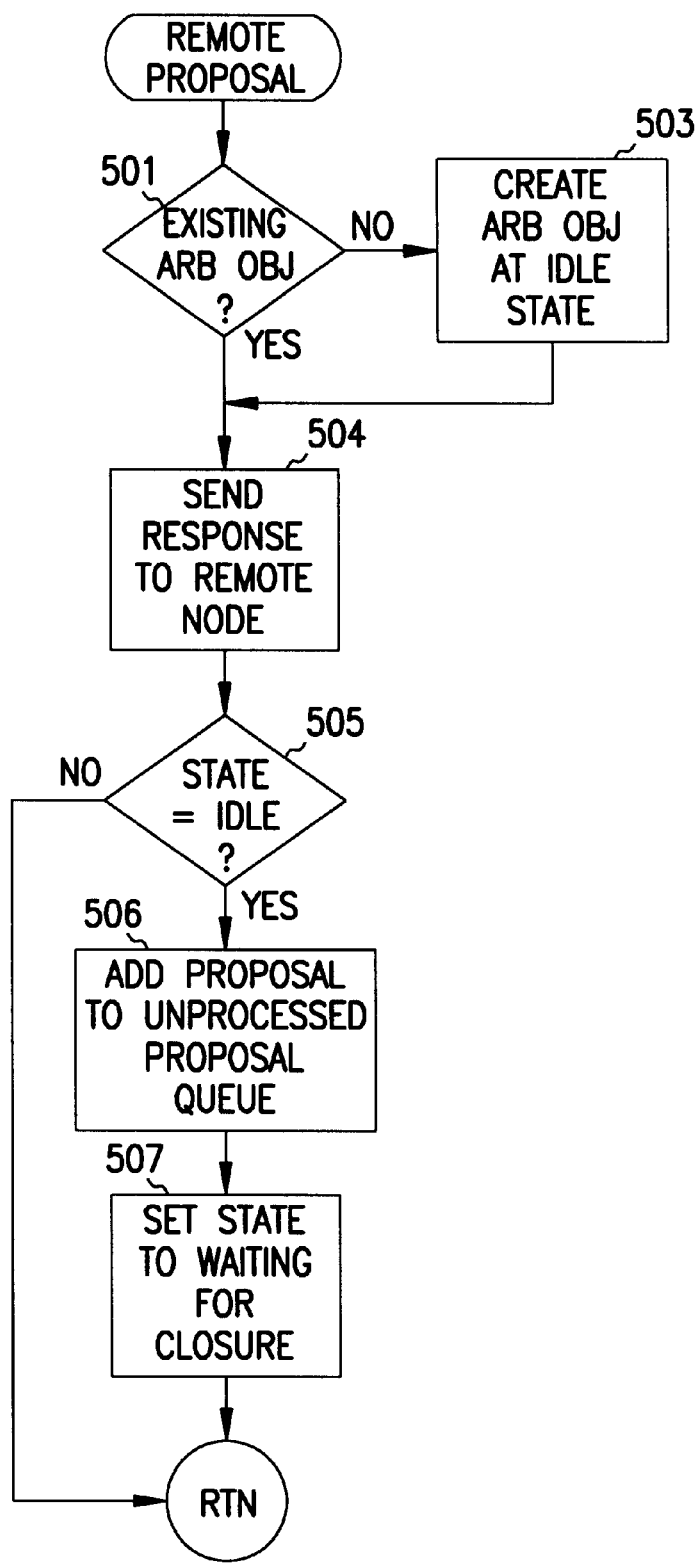

FIG. 4 illustrates the method performed when the local node initiates a proposal to change an entity, i.e., is an instigator. First, it determines if an arbitration object for the entity to be changed already exists (block 401). If not, one is created with a state of idle (block 403). The handling of the proposal depend on the state of the arbitration object (block 405). If the state is not idle, then the arbitration object adds the proposal to an unprocessed proposal queue (also known as the pre-arbitration queue) (block 407) to be processed after the completion of the current arbitration cycle. Queuing the proposal puts the transaction thread that proposed the change to sleep (block 408). The thread is awakened when it is the first locally created proposal on the unprocessed proposal queue and all proposals on the queue are local proposals as part of the post-cycle processing as described below in conjunction with FIG. 11. The proposal is removed from the queue and the processing starting with block 405 is repeated.

If the state of the arbitration object is idle, the arbitration object adds the proposal to a list of current proposals and broadcasts it to all the remote nodes in the domain, i.e., the other nodes that are also working on the entity (block 409), which begins the arbitration cycle for an instigator node. The arbitration object then transitions to the waiting for responses state 306 at block 411. The transaction thread is put to sleep at block 413. It is awakened when it is its turn to change the object as described in the proposal (block 415). After the change is applied, the thread invokes a post arbitration process (block 1200) so that any arbitrated proposals remaining in an arbitrated proposals queue (also known as the post-arbitration queue) can be applied.

When a proposal message is received from a remote node (so that the local node acts as an observer), the check for an existing arbitration object is performed (block 501 in FIG. 5), and one is created at idle if it does not exist (503). At block 504, the local nodes sends a proposal response to the remote node that broadcast the proposal. If the state of the arbitration object is idle, the proposal message is added to the unprocessed proposal queue (block 506) and the arbitration object transitions to the waiting for closure state 304 as an observer (block 507) to begin an new arbitration cycle. If the state of the arbitration object is not idle, the remote proposal message is handled by the arbitration object as described below in conjunction with FIGS. 6–8.

The two types of arbitration cycles are next discussed individually with reference to the flowcharts in FIGS. 6–12, beginning with the arbitration process for an observer node.

The arbitration object remains in the waiting for closure state 304 until it receives a closure message. As discussed in the previous section, as an observer, the local node can receive additional proposals while it is waiting for the closure message and cannot determine which proposals belong to the current arbitration cycle until it receives the closure message. Once the node receives the closure message, the nodes involved in the current arbitration cycle are defined but the arbitration cycle cannot terminate until the arbitration object receives a proposal from each node in the cycle. Therefore, once the closure message is received, the arbitration object can transition from the waiting for closure state 304 to a waiting for proposals state 305 if all the proposals have not yet been received, or back to the idle state 303 if all the proposals have been received, which terminates the current arbitration cycle.

Figure 6:
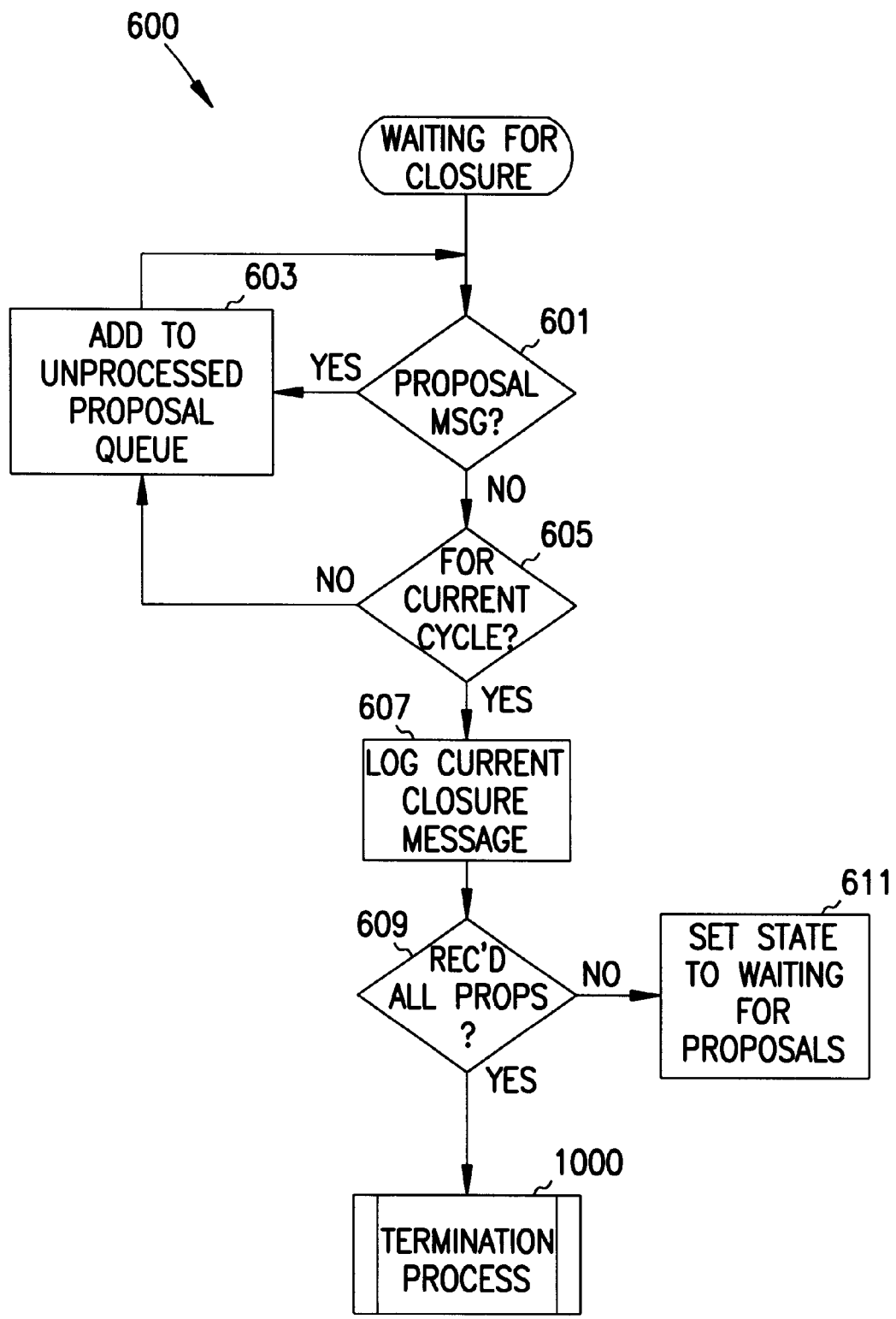

The processing for the waiting for closure state 304 is shown in FIG. 6 and described next for an observer node. When the arbitration object receives a message, it determines if the message is a closure message or a proposal message. An arbitration object for an observer node will not receive response messages since the node has not initiated a proposal.

If the message is a proposal message (block 601), the arbitration object adds the message in the unprocessed proposal queue associated with the arbitration object (block 603) because, as discussed in the previous section, an observer cannot tell which proposals belong to the current arbitration cycle until it receives a closure message. Proposal messages initiated locally are also queued in the unprocessed proposal queue.

Messages in the unprocessed proposal queue are maintained in the order in which they are received at the node. The unprocessed proposal queue associates each message with the node that sent it.

If the message is a closure message (block 601), the arbitration object determines if the closure message is for the current cycle (block 605). In one exemplary embodiment, the determination is made by counting the number of unprocessed proposals received from the same node that sent the closure message. Because a proposal message is guaranteed to arrive before the closure message from the same node, at least one proposal message will have been received. If there is only one such proposal message in the unprocessed proposals queue, the closure message is for the current arbitration cycle. If there is more than one such proposal message, then the closure message is for a different arbitration cycle and gets added to the unprocessed proposal queue (block 603). Consider for example, the sequence of messages P1, P2, C sent from node N1 to node N2, where P1 and P2 are proposals and C is a closure message. The current arbitration cycle is initiated by P1. The fact that C follows P2 implies node N1 sent C after sending P2 and therefore the closure message C belongs to the same cycle as P2. C cannot belong to the current arbitration cycle since that would imply that two proposals from the same node belong to the same cycle, which is not allowed in the present invention. In order for C to belong to the current cycle, the sequence must be P1, C, P2.

When the closure message is determined to be for the current arbitration cycle, it is logged (block 607). The log process copies the list of instigator nodes in the closure message into a list of nodes in the current arbitration cycle, which defines the proposal messages that the arbitration object must receive before it can terminate the current arbitration cycle. The arbitration process scans the unprocessed proposal queue and updates the list of current proposals by adding the first proposal on the queue from each node belonging to the current arbitration cycle. The arbitration object also maintains a list of nodes from which it has received proposals (list of received proposals), so it adds the appropriate nodes to that list as well.

Figure 7:
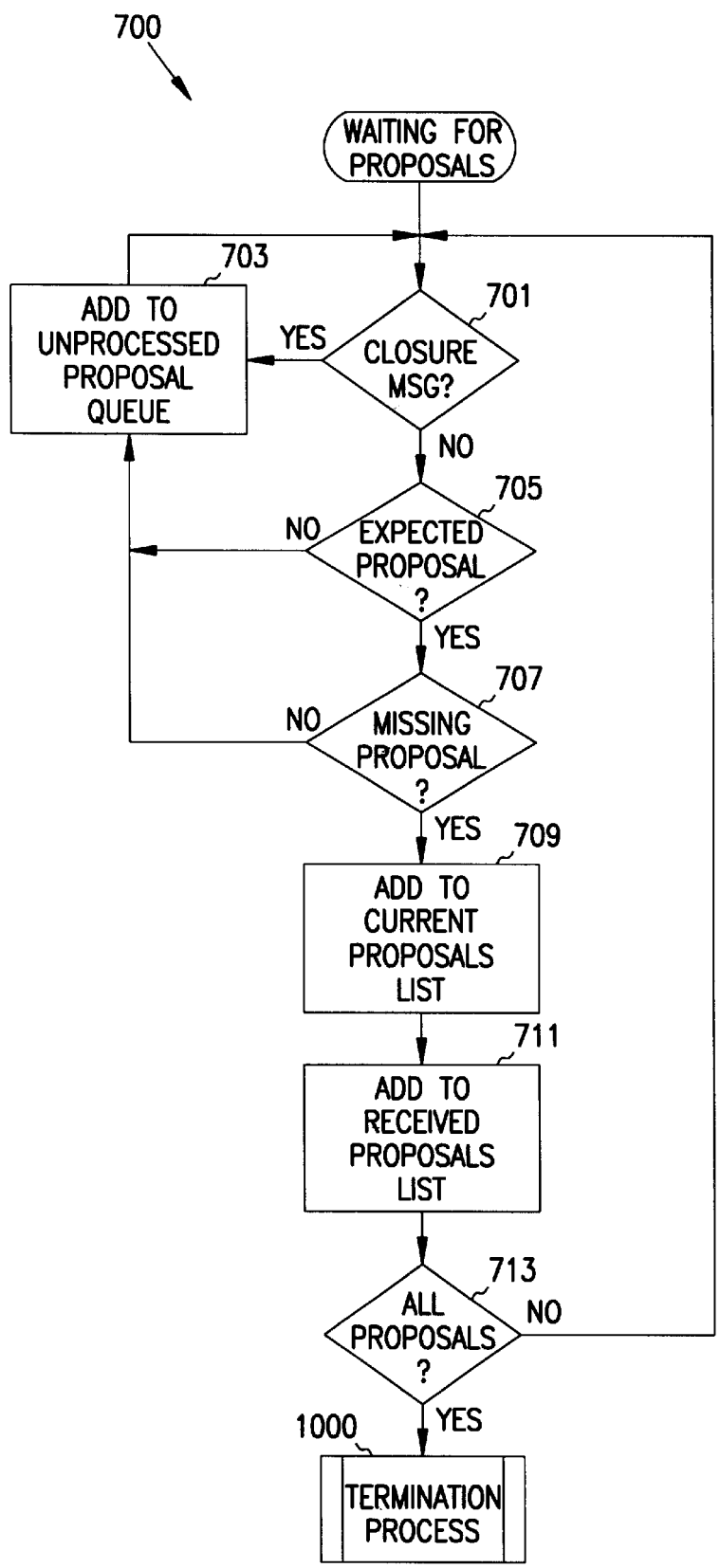

At this point, the arbitration object can determine if it has received all the proposals for the current arbitration cycle on the observer node (block 609). If it has, it invokes a termination process (block 1000), which is described below in conjunction with FIG. 10, that sets the arbitration object back to the idle state 303. If not, the arbitration object transitions to the waiting for proposals state 305 (block 611). The processing for the waiting for proposals state 305 is illustrated in FIG. 7. Note that the waiting for proposals state 305 is unique to an arbitration object on an observer node.

Once in the waiting for proposals state 305, the arbitration object can receive closure messages as well as proposal messages Because an arbitration object is in the waiting for proposals state 305 as a result of receiving a closure message for the current arbitration cycle, any closure message received during the waiting for proposals state 305 is added to the unprocessed proposal queue (block 703).

A proposal message that is received is checked against the list of nodes in the current cycle from which the arbitration object is expecting proposals (block 705). If it is not from such a node, the proposal is added to the unprocessed proposal queue (block 707). If it is from such a node, the arbitration object determines if a proposal has already been received for the node (block 709). Any additional proposals received from a node are added to the unprocessed proposal queue (block 707). If the proposal message is from a node that was missing a proposal message, the proposal is added to the list of current proposals (block 709) and to the list of nodes for which proposal message have been received (block 711).

If all the expected proposals have been received (block 713), then the arbitration object invokes the termination process (block 1000) and transitions back to the idle state 303. Otherwise, the arbitration remains in the waiting for proposals state 305.

Figure 8:
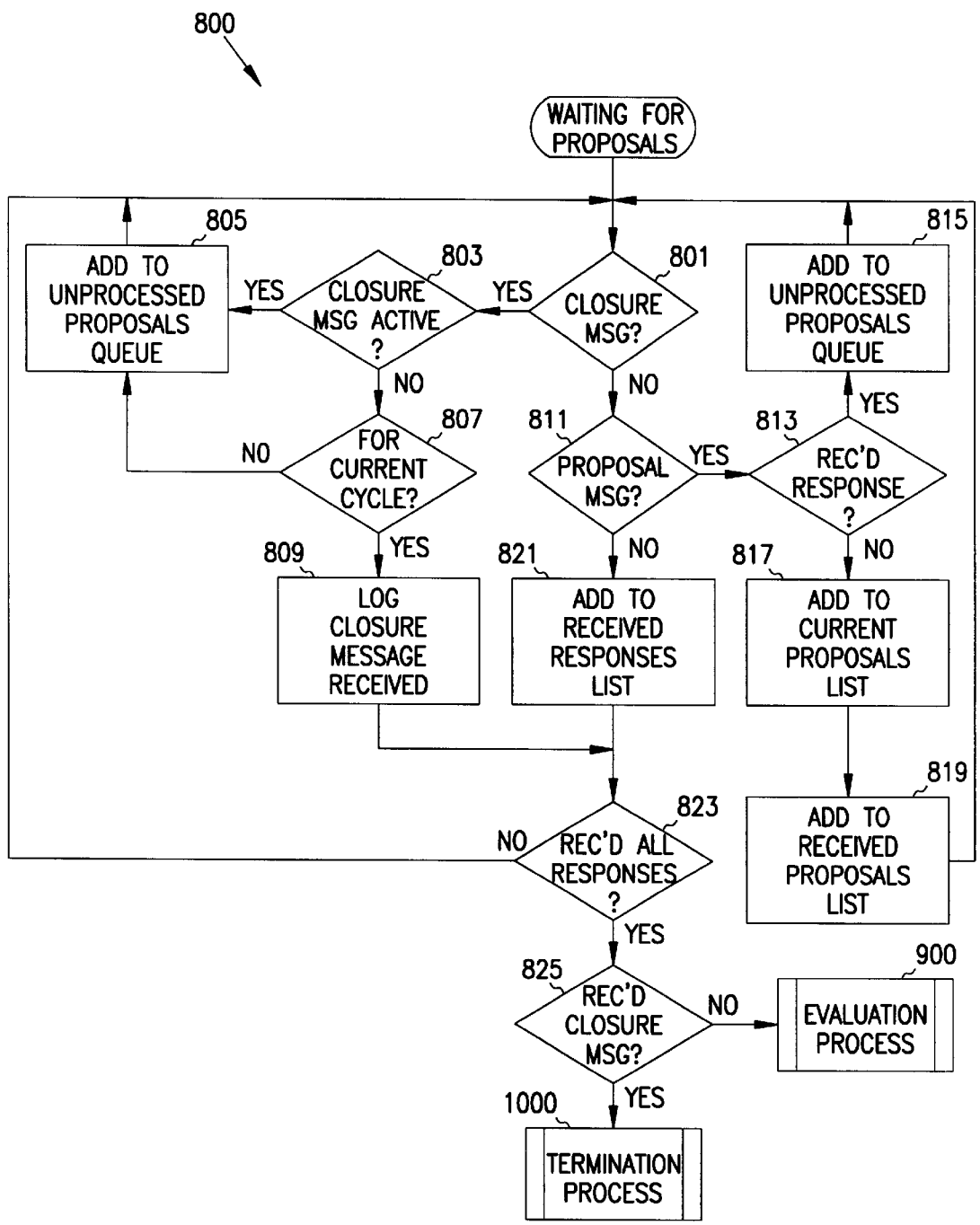

Proceeding now to the arbitration process 301 for an instigator in FIG. 3, the arbitration object remains in the waiting for responses state 306 until the local node has received responses from each of the remote nodes to which the proposal message was sent. While in the waiting for responses state 306, the arbitration object can receive closure messages and additional proposals, as well as responses. The processing for the waiting for response state 306 is illustrated in FIG. 8.

If the local node receives a closure message 801, the arbitration object determines if a closure message (block 803) for the current cycle has previously been logged (referring to block 809). If so, then the closure message is added to the unprocessed proposal queue. If there is no current closure message, the arbitration object determines if the received closure message is for the current cycle (block 807). The closure message belongs to the current arbitration cycle if 1) there is a proposal from the same remote node in the current arbitration proposal list, and 2) there are no proposals from that remote node in the unprocessed proposal queue. As in block 707, a closure message from a node having only one proposal is a closure message for the current cycle. Other closure messages are added to the unprocessed proposal queue (block 805).

The closure message for the current cycle is logged (block 809). The arbitration object determines whether it has received responses from all the nodes in the current cycle (block 823). If not, the arbitration object remains in the waiting for responses state 306. When all responses for the current cycle are received, the arbitration object invokes the termination process (block 1000). Note that in this case, the node sending the closure has already been determined the winner of the arbitration.

If the message is a proposal message (block 811), the arbitration object determines whether it has already received a response from the node that sent the proposal (block 813). If so, the proposal is added to the unprocessed proposal queue. Otherwise, the proposal is added to the list of current proposals for the arbitration cycle (block 817) and to the list of received proposals (block 819).

When a response message is received, the arbitration object adds it to a list of received responses (block 821). The list is then checked against the list of expected responses for the current cycle (block 823). If all the expected responses have been received and a closure message has not yet been received (block 825), the arbitration object invokes the evaluation process (block 900).

Figure 9:
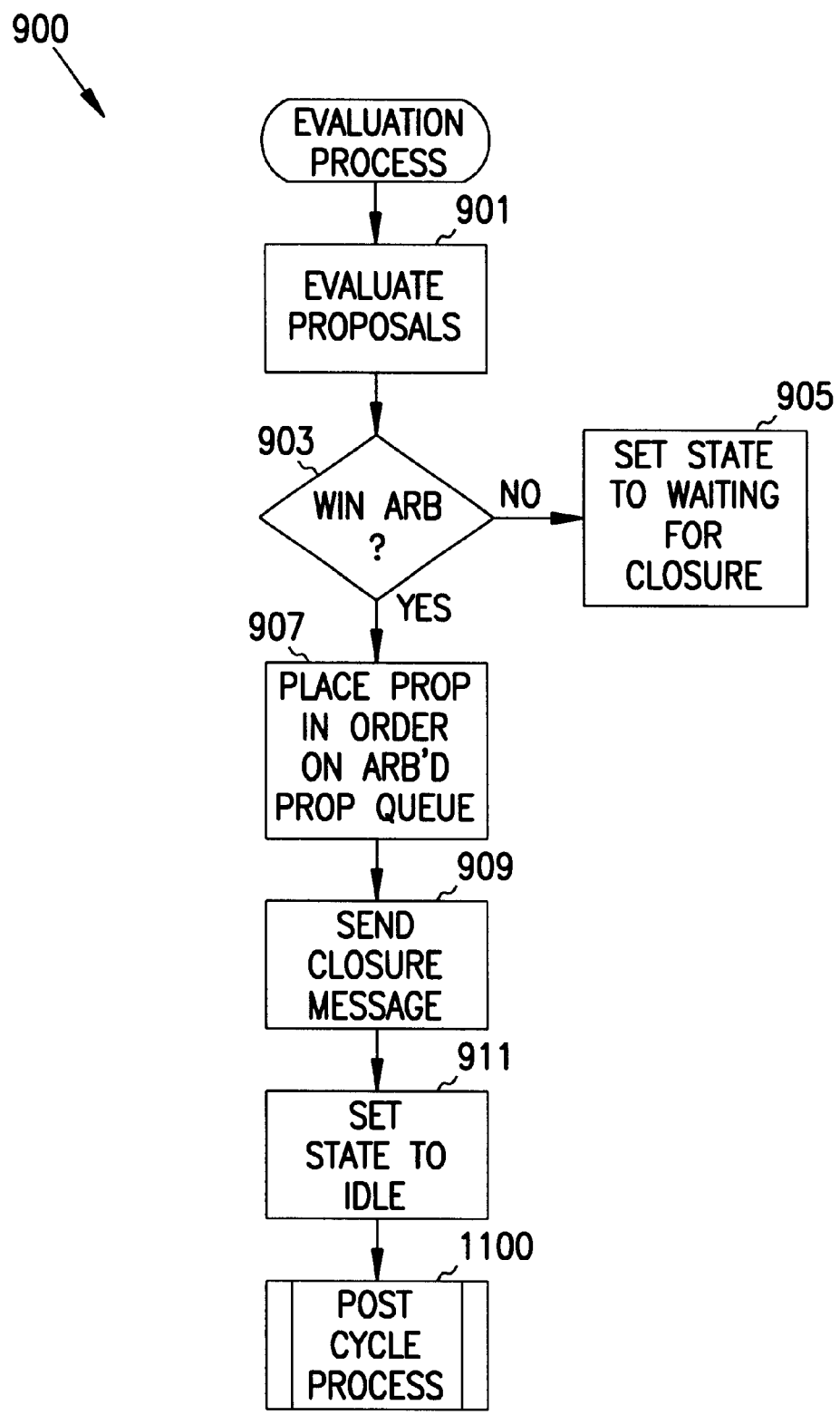

FIG. 9 illustrates the evaluation process 900. The process begins by deciding the winner of the arbitration based on the proposals in the cycle (block 901) using a predetermined ranking criteria. If the local node is the winner, the proposals are ordered and added to the arbitrated proposals queue (block 907) based on a pre-determined ordering criteria.

Both the pre-determined ranking and ordering criteria are dependent upon the type of the entity being changed and the changes proposed. Thus, the arbitration object for a specific type of entity contains the appropriate criteria to determine the proper rank and order of the proposals. In one exemplary embodiment, the pre-determined ranking criteria is the unique transaction identifier, and the node that instigated the proposal with the highest rank is the winner of the arbitration. In this exemplary embodiment, the pre-determined ordering criteria is the same as the pre-determined ranking criteria so the winner's proposal is ordered first. In an alternate embodiment, the ordering criteria is decoupled from the ranking criteria so the ordering criteria can be a complicated as comparing the changes in each proposal to determine the best order in which to apply the proposals, or that a proposal cannot be applied because it is mutually exclusive to another proposal in the cycle. The unique node identifier can also be used as the ranking criteria or ordering criteria.

In a further alternate embodiment, certain proposals are considered "expedited." An expedited proposal is one that must be processed in conjunction with a previous, already arbitrated proposal. For example, a single transaction A can make two different modifications (A1 and A2) to the same database record. After applying the proposal A1 to the record, the database manager locks the record so no additional changes could be made until the transaction A commits or aborts the change. If a proposal B1 for the same record from a different transaction B was put in the change queue for the record before the proposal A2 (i.e., the proposal B1 won the arbitration over the proposal A2), the proposal A2 could not be processed until the proposal B1 was applied. But the proposal B1 cannot be applied until the transaction A releases the lock and the transaction A cannot release the lock until the proposal A2 is applied. This results in a classic "deadlock" situation as will be readily understood by one skilled in the art. Classifying proposal A2 as an expedited proposal causes it to be added to the arbitrated proposals queue before all non-expedited proposals such as B1 but after any existing expedited proposals. This avoids the deadlock situation. Additionally, one expedited proposal can execute simultaneously with a non-expedited proposal as described below in conjunction with FIG. 12.

The closure message is created and sent to the other nodes in the arbitration cycle (block 909). In an alternate embodiment in which only the winner node executes the ordering logic, the resulting order is included in the closure message to ensure the other nodes apply the proposals in the proper order. The arbitration object state is set to idle (block 911) and a common post cycle process is performed (block 1100) as described in conjunction with FIG. 11 below.

If the local node is not the winner (block 903), the arbitration object's state is set to waiting for closure (block 905). In an alternate embodiment not illustrated, when the local node is capable of executing the ordering logic itself, the local node transitions directly to the termination process shown in FIG. 10. Thus, it does not follow the state change arrow from the waiting for responses state 306 to the waiting for closure state 307 in FIG. 3, but instead follows the state change arrow from the waiting for responses state 306 to the idle state 303 just as does the winning node.

Returning to FIG. 6, an arbitration object in the waiting for closure state 307 on an instigator node receives only proposal and closure messages since all the response messages for the current cycle have been received. If the message is a proposal message (block 601), it is added to the unprocessed proposal queue because proposals that belong in the current arbitration cycle are defined as those received before all responses to the locally initiated proposal was received, and thus proposals received at this stage belong to a different arbitration cycle.

If the message is a closure message, the arbitration object determines if the closure message is for the current cycle at block 605. Because the local node is an instigator in the current arbitration cycle, the criteria differs somewhat from that described above for an observer node. The set of nodes in the current arbitration cycle is determined by the set of proposals in the list of current proposals (described with reference to FIG. 8). If the closure message is from a node that has no proposal in the list, the node is not part of the current cycle, and therefore, the closure message does not belong to the current cycle. If the closure message is from a node that is part of the current cycle, then the closure belongs to the current cycle as long as there are no proposals in the unprocessed proposals queue from that node, i.e., the sequence of messages from that node must be P1, C, P2 and not P1, P2, C, as previously explained for an observer node.

If it is not for the current cycle, the closure message is added to the unprocessed proposal queue (block 603). If it is for the current cycle, the closure message is logged at block 607 as described above. All proposals already have been received for this arbitration cycle at this stage (block 609), so the arbitration object invokes the termination process (block 1000).

Figure 10:
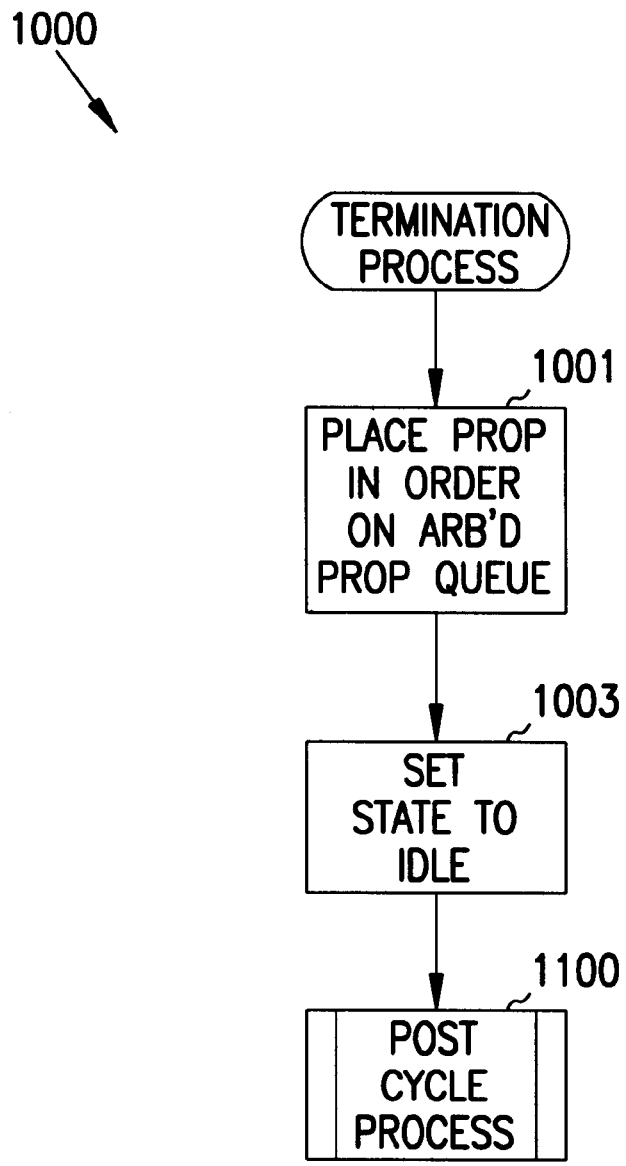

The termination process 1000 is described in conjunction with FIG. 10. The proposals are queued in order on the arbitrated proposals queue (block 1001). The ordering determination is performed by the termination process using the same pre-determined ranking and ordering criteria discussed above in conjunction with the evaluation process. In the alternate embodiment in which the termination process does not apply the ordering criteria, the proposals are ordered based on the information in the closure message. The arbitration object's state is set to idle (block 1003) and the common post cycle process is invoked (block 1100).

Figure 11:
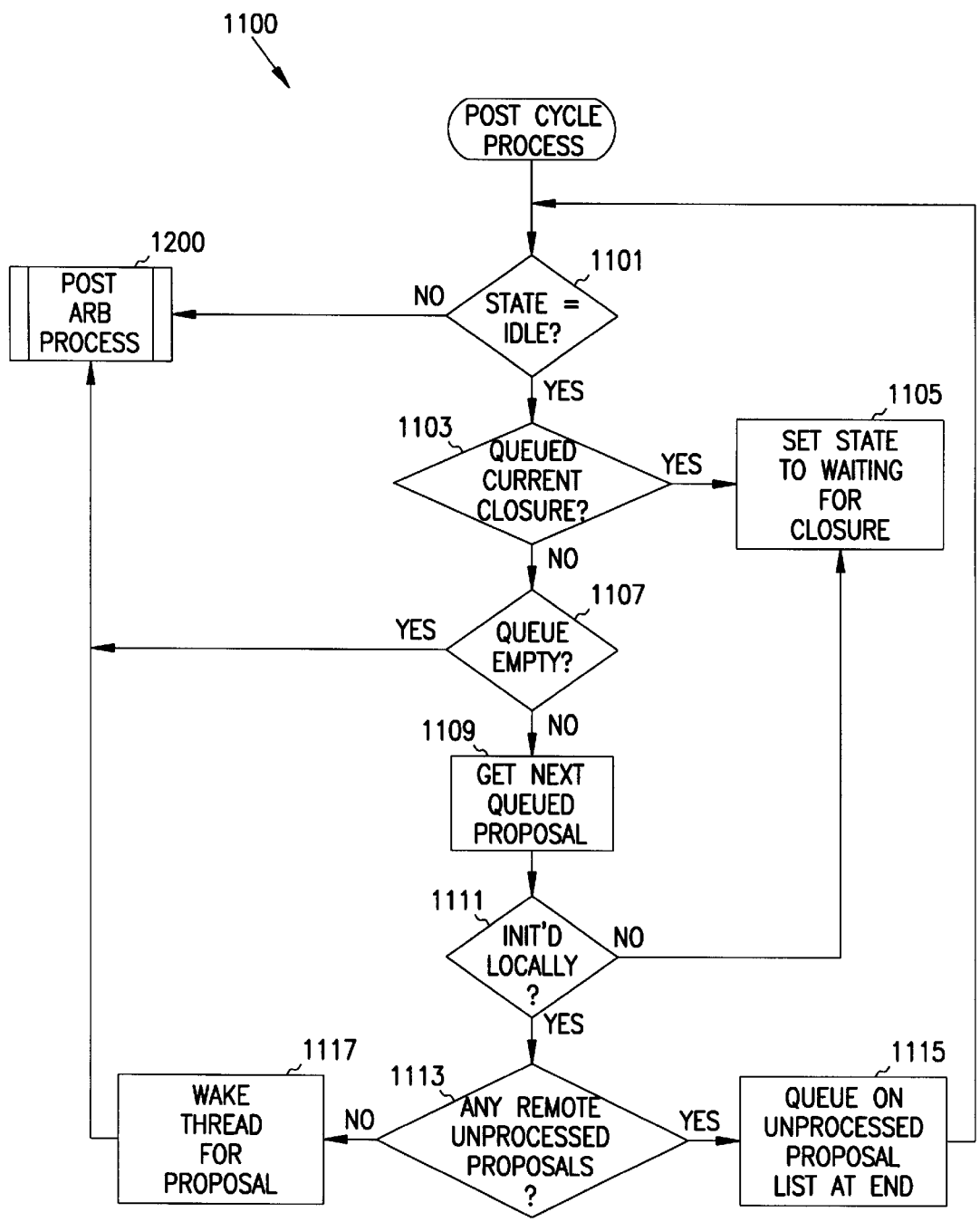

FIG. 11 illustrates the post cycle process 1100. Because the main purpose of the post cycle process is to restart the arbitration process to process any queued proposals or closure messages, the state of the arbitration object is first checked to determine if it is still idle (block 1101). If another arbitration cycle has been initiated before the post cycle process begins, the post cycle process continues onto the post arbitration process (block 1200) described below.

If the arbitration object is still in an idle state, the unprocessed proposal queue is examined to determine if there is a current closure message on it (i.e., one from a node for which there is only one queued proposal) (block 1103). If a current closure message is found, the state of the arbitration object is set to waiting for closure (block 1105).

If there is no current closure message on the list, then the post cycle process determines if there are any proposal messages in the queue (block 1107). If the queue is empty, the post cycle process invokes the post arbitration process (block 1200). Otherwise, the post cycle process gets the next proposal from the queue (block 1109) and determines if it was initiated by the local node (block 1111). A queued proposal from a remote node causes the post cycle process to set the arbitration object's state to waiting for closure to begin the arbitration cycle for the remote proposal as an observer.

If the proposal was initiated locally, it was added to the unprocessed proposal queue because an arbitration cycle was already in progress when the local node initiated the proposal as described above with reference to FIG. 4. In this case, the unprocessed proposal queue is again examined (block 1113). If there are no remote proposals in the queue, the processor thread that initiated the local proposal is awakened (block 1117). The newly-awakened thread attempts to begin a new arbitration cycle based on the unprocessed proposal, again referring to the process described for FIG. 4.

If remote proposals remain to be processed, the locally initiated proposal is placed at the end of the unprocessed proposal queue (block 1115) and the post cycle process continues checking the unprocessed proposal queue while the arbitration object is in the idle state.

Figure 12:
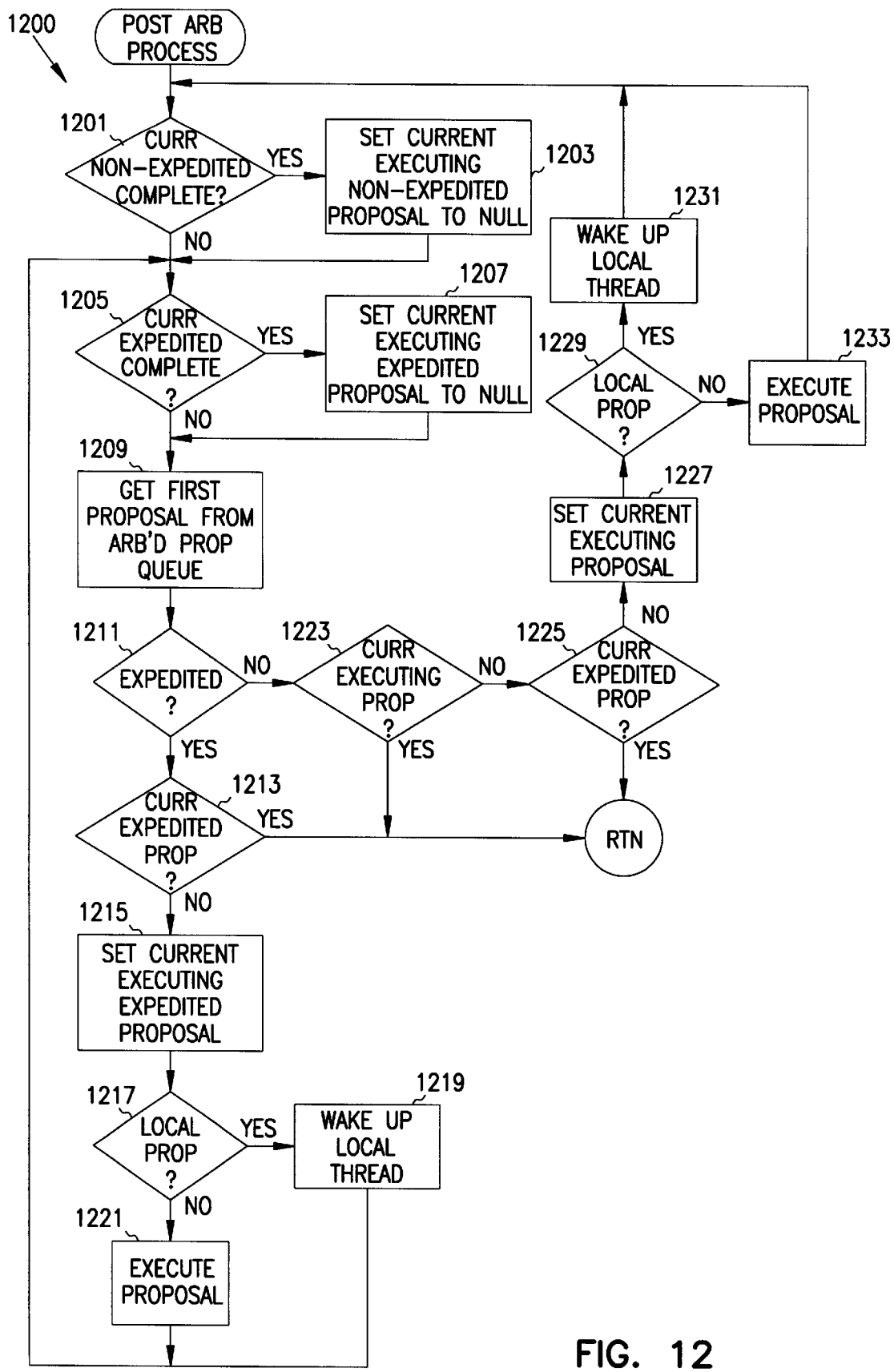

The post arbitration process 1200 that causes the arbitrated proposals to be applied on the local node is described in conjunction with FIG. 12. The post arbitration process executes asynchronously to any arbitration cycles and continues executing until there are no proposals on the arbitrated proposal queue. When the post arbitration process is not executing, it is invoked when an arbitrated proposal is placed on the arbitrated proposals queue at the end of an arbitration cycle. In the exemplary embodiment shown in FIG. 12, two proposals can be executing at the same time: an expedited proposal and a non-expedited proposal. The arbitration object maintains a state for the currently executing expedited proposal and for the currently executing non-expedited proposal.

Assuming initially that there are no executing proposals, the post arbitration process gets the first proposal from the arbitrated proposals queue (block 1209), and determines if it is an expedited or non-expedited proposal (block 1211). If it is an expedited proposal and no. expedited proposal is currently executing (block 1213), the state for the currently executing expedited proposal is set to the expedited proposal (block 1215). If the proposal was initiated locally (block 1217), the corresponding thread was put to sleep to await the outcome of the arbitration as described above in conjunction with FIG. 4, so it is woken up to execute the proposal. If the proposal was from a remote node, the proposal is executed in a special thread. In both cases, when the thread completes and returns to the post arbitration process, the state of the currently executing expedited proposal is set to NULL and the next proposal on the arbitrated proposal queue is examined.

If the queued proposal is a non-expedited proposal, it can be executed if 1) there is no currently executing non-expedited proposal (block 1223), and 2) there is no currently executing expedited proposal (block 1225). In this case, the state of the currently executing non-expedited proposal is set to the non-expedited proposal (block 1227). As with an expedited proposal, the thread for a non-expedited proposal that was initiated locally is woken up to execute the proposal (block 1231) while a special thread executes a non-expedited proposal from a remote node (block 1233). When either thread completes, it returns to the post arbitration process, and the state of the currently executing non-expedited proposal is set to NULL.

The post arbitration process continues processing the arbitrated proposals queue in this fashion until all the arbitrated proposals are applied. One of skill in the art will readily understand that the operations shown in FIG. 12 for expedited proposals are not necessary for in alternate embodiments in which proposals are not expedited.

The particular methods performed by computers executing an exemplary embodiment of the arbitration process of the present invention have been described with reference to a state diagram and a series of flowcharts. The states of idle 303, waiting for closure 304, 307, waiting for proposals 305, and waiting for responses 306 have been described in conjunction with the state diagram, and the methods that implement the states of the arbitration object have been illustrated in the flowcharts of FIGS. 4–12, including all the acts from 401 until 415, from 501 until 507, from 601 until 611, 701 until 713, 801 until 825, 901 until 911, 1001 until 1003, 1101 until 1117, and 1201 until 1233.

In Memory Database Implementation

In this section of the detailed description, a particular implementation of the arbitration process of the present invention is described that is used in a coherent caching version of the In Memory Database (IMDB) system available from Microsoft® Corporation. IMDB is a system used to cache database tables entirely within memory, and to read and write a table from and to a backend database provider computer. The coherently cached version of IMDB allows the same database table to be cached on multiple machines (nodes on a network) and guarantees that the table will appear the same on each machine to transactions that are running on those machines. To be more specific, suppose a table T is shared on three machines M1, M2, and M3. M1 runs transactions X11, X12, and X13 against T. M2 runs transactions X21 and X22 against T, and M3 runs transactions X31, X32, X33, and X34 against T. Assume that no additional transactions are run on any machine. When all machines quiesce, then the contents of table T on all machines will be identical. Now suppose transaction X11 on machine M1 and transaction X21 on machine M2 are running concurrently. Suppose both transactions change record R in table T. There are two possible orderings of the changes to record R: {X11, X21 } or {X21, X11}. The arbitration process guarantees that the same ordering of the changes will occur on all machines caching table T.

The exemplary IMDB implementation of the arbitration process relies on the fact that each instigator node in the domain is aware of the other nodes that coherently cache the object being changed and with which it must communicate to keep data in the object consistent. A variety of techniques can be used to determine which nodes belong to the domain and how nodes are added or dropped as machines are connected or disconnected from the network, as will be easily understood by one skilled in the art. Furthermore, the exemplary IMDB implementation assumes the underlying network protocol adheres the Notification Rule as described in the previous sections, i.e., the network reliably delivers messages sent from one machine to another in order. That is, if M1 sends messages A and then B to M2 then M2 receives message A before it receives message B and that it receives both of them (unless machine A or B happen to be disconnected from the network in the interim). The arbitration process does not make any assumption about the ordering of messages from different machines, i.e., messages between M1 and M3 can be interleaved in any fashion with messages between M1 and M2 in the network—only the delivery of messages from one machine to another are guaranteed to be ordered.

Because the set of proposals for the current arbitration cycle are the same on all nodes (as explained in the previous sections), the IMDB implementation is able to distribute the responsibility of determining the proper order of the proposals to each node in the domain. In one embodiment, each node is assigned a unique identifier (e.g., a GUID or "globally unique identifier"). If there are multiple proposals in an arbitration cycle, they are ordered by the identifier of the node the proposal came from. The winner is determined to be the instigator node with the lowest GUID.

Alternate embodiments of the arbitration process are used in conjunction with other IMDB functions. In one alternate embodiment, the arbitration process determines which node will flush changes to the backend database provider for a given transaction when the transaction runs across multiple nodes. Yet another alternate embodiment involves choosing an internal identifier for tables and databases so that they are the same across all machines running the IMDB against a cached set of tables.

The exemplary IMDB embodiment of the arbitration process implements two basic classes to manage most of the accounting required for arbitration: ArbitrationManager and ArbitrationObject. The ArbitrationManager is a global object on each node that keeps track of all active arbitration objects on the local node and filters messages to the appropriate arbitration object as described further below in conjunction with FIG. 17. The ArbitrationObject keeps track of the state of the arbitration cycle for a given object. Since there can be only one arbitration cycle active for any given entity, there is at most one arbitration object for any entity that is cached on multiple nodes. The ArbitrationObject class is a base class implementation that provides much of the bookkeeping for arbitration cycles. As there can be different implementations of how proposals are processed depending on the type of change proposed, e.g., record changes, choosing database identifiers, etc., various key methods of the base ArbitrationObject class can be overridden by more specialized classes responsible for handling certain kinds of changes. The ArbitrationObject is described below in conjunction with FIG. 16.

Arbitration Cycle Messages

Figure 13:
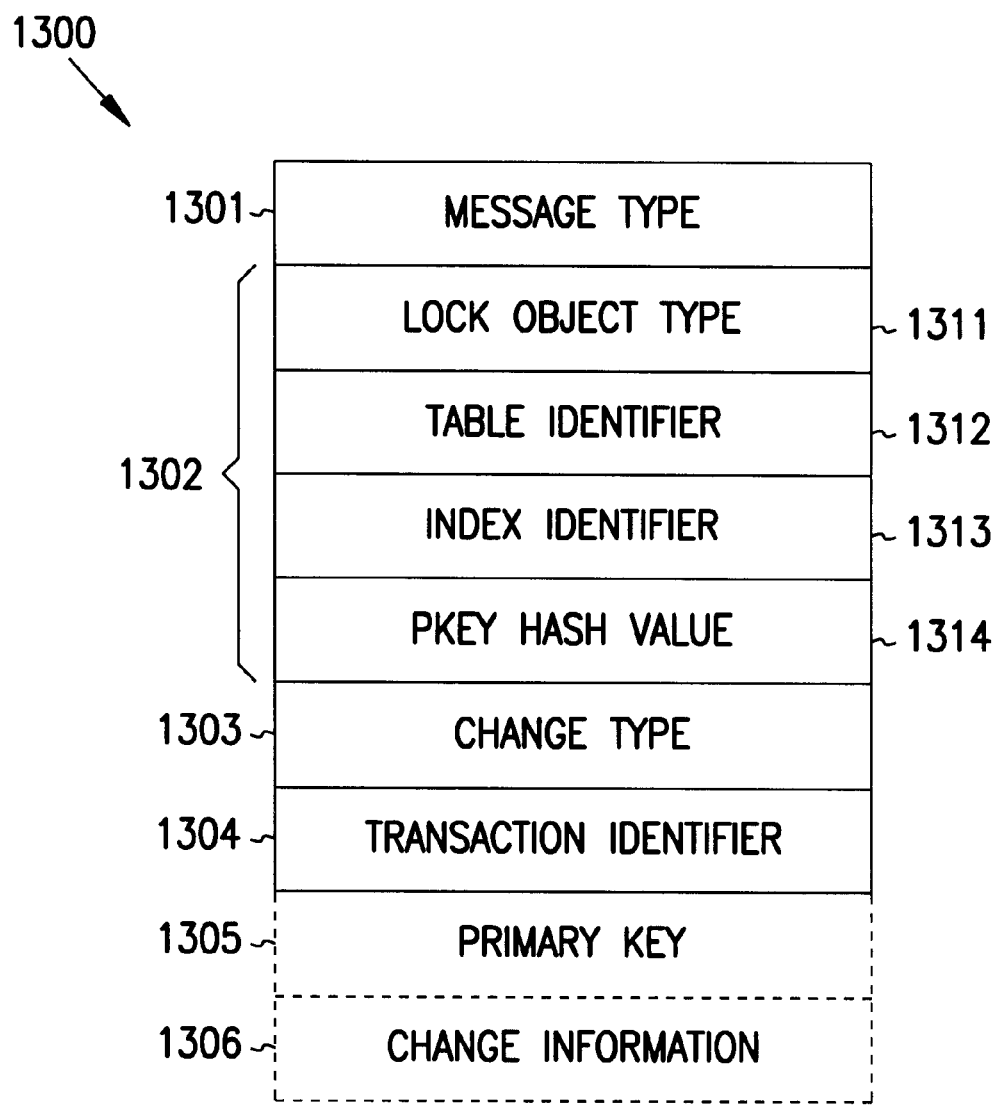
FIG. 13 is a diagram of a proposal message data structure for use in an exemplary implementation of the invention.
Figure 14:
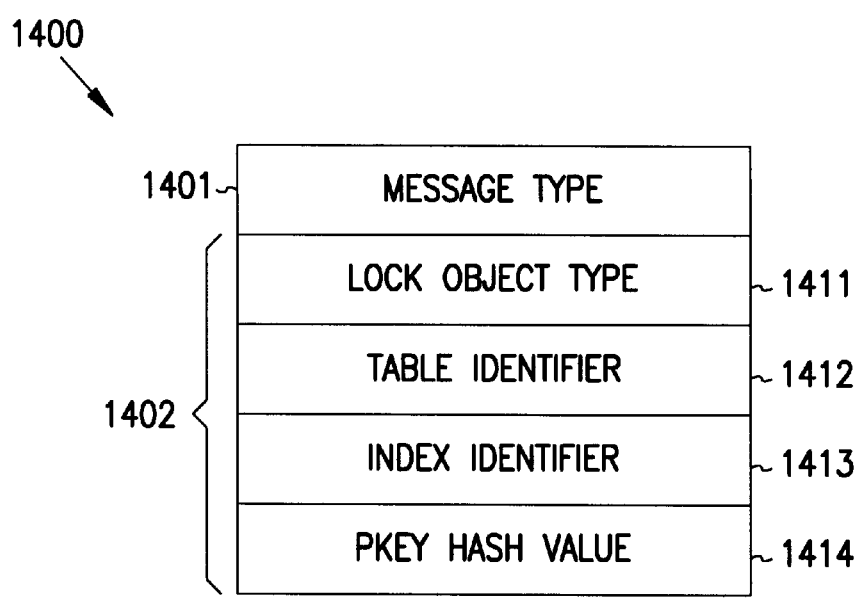
FIG. 14 is a diagram of a proposal response message data structure for use in an exemplary implementation of the invention.
Figure 15:
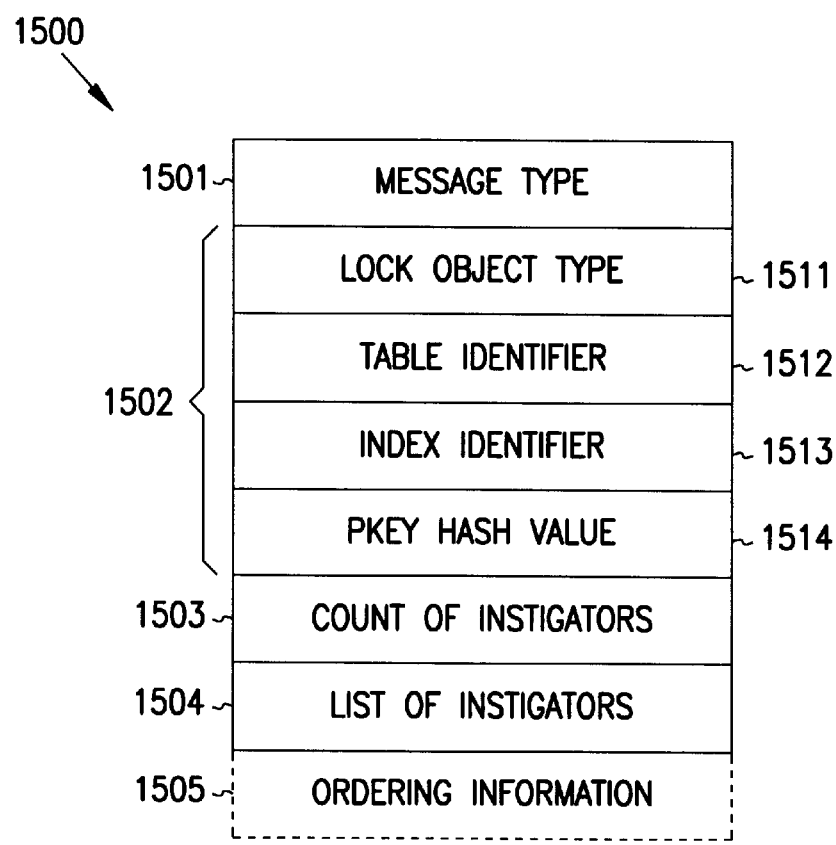
FIG. 15 is a diagram of a closure message data structure for use in an exemplary implementation of the invention.

As described in the previous section, three kinds of messages used as part of an arbitration cycle. FIGS. 13, 14 and 15 illustrate exemplary embodiments of data structures for the proposal, proposal response, and closure messages, respectively, as used by the IMDB implementation. Each message contains a message type field 1301, 1401, 1501, and an identifier 1302, 1402, 1502 for the object being arbitrated. In the IMDB implementation, the object identifier 1302, 1402, 1502 for a record comprises a lock object type 1311, 1411, 1511, a table identifier 1312, 1412, 1512, an index identifier 1313, 1413, 1513, and a hash value for the primary key of the record 1314, 1414, 1514.

The proposal message 1300 also contains a change type field 1303 and a transaction identifier 1304 for the associated transaction. In the IMDB implementation, the transaction identifier is a GUID. If the change is to insert a record, a change section 1306 of the proposal message 1300 contains all columns and their associated values. If the change is to modify a record, the full value of the primary key 1305 (shown in phantom) is included because two different primary keys can hash to the same value and the primary key is needed to determine which hash duplicate is associated with the target record. The change section 1306 for a modification contains the column(s) to be modified and the new value(s). If the change is to delete a record, the identifier 1302 and primary key 1305 are sufficient to define the change, so the change section 1306 is not present. In the alternate embodiment described above in which an arbitration cycle is used to determine which node chooses the internal identifiers for shared tables in the database, the change section 1306 contains the database identifier of the table to be allocated an internal identifier.

The proposal response message 1400 contains only the message type 1401 and the identifier for the entity 1402.

The closure message 1500 contains the message type 1501 and the identifier for the entity 1502, plus a count 1503 and a list 1504 of all instigator nodes in the arbitration cycle. In the exemplary embodiment, the nodes are identified by their GUID. FIG. 15 also shows, in phantom, ordering information 1504 for the proposals that can be optionally included in the closure message 1500.

ArbitrationObject

The ArbitrationObject keeps track of the proposals, responses, and closure messages. It calls out to virtual functions that handle specific arbitration events (discussed in detail further below). As described in the previous sections, it is possible to get a proposal from a node that does not belong to the current arbitration cycle. For example, a node may send a proposal, then closure, then a proposal from the next arbitration cycle before we have received the remaining proposals from the current arbitration cycle. One of the tasks of the ArbitrationObject is to determine what proposals belong to which arbitration cycles and queue up any proposals for future cycles. Additionally, once a cycle is complete, the ArbitrationObject executes the proposals as discussed above in conjunction with the post cycle and post arbitration processes of FIGS. 11 and 12, respectively. The ArbitrationObject must ensure that the changes in the proposals are applied in the correct order. It therefore maintains an ordered queue of arbitrated proposals that need to be applied, as explained in the previous section.

An exemplary implementation of an ArbitrationObject is illustrated in FIG. 16. The ArbitrationObject 1600 is identified by the identity of the entity 1601 for which it manages arbitrations and has an ArbitrationState property 1602 that is used to manage the corresponding arbitration cycle. As described above, the ArbitrationState property can be either Idle, WaitingForResponses, WaitingForClosure, or WaitingForProposals. Idle means that there is no current arbitration cycle. Any other state indicates that an arbitration cycle is active. WaitingForResponses indicates that the local node broadcast a proposal to other nodes (i.e., the node is an instigator) and is waiting for responses from the other nodes in the domain. WaitingForClosure means either: (1) the local node is an observer and is waiting for a closure message from the current cycle or (1) the local node is an instigator that has performed the evaluate method and determined that it lost the arbitration, and is therefore waiting for the closure method from the winner of the arbitration. WaitingForProposals means that the local node is an observer that has received the closure message for the current arbitration cycles and is waiting for other proposals for the current arbitration cycle.

The ArbitrationObject contains a series of lists and queues to manage the messages it sends and receives. The processing of the lists and queues by the ArbitrationObject is as explained in the previous section in conjunction with the similarly named lists and queues.

NodesSentProposalsTo 1603: If the local node is an instigator, then this is the list of nodes to which it sent proposals.

NodesReceivedResponsesFrom 1604: If the local node is an instigator, this is the list of nodes from which it received proposal responses.

NodesExpectingProposalsFrom 1606: If the local node acting as an observer received a closure message, the list of nodes from that message that are instigators in the current arbitration cycle.

NodesReceivedProposalsFrom 1607: The nodes that sent proposals that belong to the current cycle.

ProposalsInTheCurrentCycle 1608: Proposals for the current arbitration cycle. (1608)

ClosureForTheCurrentCycle 1609: Closure message 1610 and node 1611 it came from for the current cycle.

QueueOfUnprocessedProposals 1612: An ordered-queue of proposals that the local node has received but which have not yet been included in any arbitration cycle. This queue can also include unprocessed closure messages as described in the previous section.

QueueOfArbitratedProposals 1613: An ordered queue of proposals that have been arbitrated and that need to be processed in order at the local node.

The ArbitrationObject object also maintains a state for the currently executing non-expedited proposal 1614, and for the currently executing expedited proposal 1615. A reference count 1616 in the ArbitrationObject is incremented every time a proposal or closure is added to the ArbitrationObject and is decremented whenever a proposal completes execution or there is no longer a need for the closure message. In addition, other objects in the IMDB can hold on to the ArbitrationObject when necessary. For example, a transaction maintains a list of all arbitrations that involve a record change performed by that transaction until the transaction completes. The transaction uses the list to determine when all proposals related to the transaction (both local and remote) have completed execution. The transaction increments the reference count of the ArbitrationObject when it adds it to the list and decrements it on completion of the transaction. The ArbitrationManager frees up any ArbitrationObject that has a reference count of zero, since that means there are no proposals or closures left to process and also there are no external objects holding onto the arbitration.

Also as described previously, an ArbitrationObject must handle the arbitration cycle events of arbitrate, evaluate, and terminate. Because different entities in the IMDB require different types of processing, the base class ArbitrationObject does not contain the methods necessary to evaluate the proposals for a specific database object, or other entity, or to properly apply the changes in the proposals. Instead, the base class calls "virtual" functions, and the ArbitrationObject instantiated to manage the arbitrations for the database object provides the methods that implement the virtual functions to appropriately process the events. Exemplary embodiments of the virtual functions in the base class are described next.

An Evaluate function called if the arbitration cycle was initiated locally (i.e., the local node is an instigator) when all responses have been received from the nodes to which proposals were sent. The Evaluate function is responsible for determining whether the local node wins the arbitration. If so, it must return a closure message. In addition, it adds the proposals in the current arbitration to the QueueOfArbitratedProposals 1613 so that they are processed in the correct order. If Evaluate determines the local node is not the winner, then it returns a value of NULL.

A Terminate function is called either when the local node is an observer or an instigator that lost the arbitration. In both cases, the local node will have received all messages from all other nodes to the current arbitration cycle and all proposals for the current cycle will be cached in the ArbitrationObject. The Terminate function must order the proposals for the current cycle and add them to the QueueOfArbitratedProposals 1613 so that they are processed in the correct order on the local node.

A ProcessRequest function is called to process a remotely received proposal during the post arbitration process described in the previous section as a special thread. It changes the object that was the subject of an arbitration in accordance with the contents of the proposal.

An IsExpeditedProposal function is called by the ArbitrationObject to determine if a proposal is expedited or not. As described in the previous section, the ArbitrationObject adds an expedited proposal to the top of the QueueOfArbitratedProposals 1613 when only nonexpedited proposals are on the queue, and after the last expedited proposal on the queue if the queue has existing expedited proposals. The ArbitrationObject also needs to know if a proposal is expedited to know whether the proposal can be executed concurrently with the currently executing non-expedited proposal, as also described previously.

In an alternate embodiment, the ArbitrationObject also implements an Arbitrate Virtual function. The ArbitrationObject calls the Arbitrate Virtual function for each proposal before it is added to the current cycle. The Arbitrate Virtual function permits the ordering of the proposals in the cycle in an incremental fashion rather than waiting until an Evaluate or Terminate event is triggered.

ArbitrationManager

Figure 17:
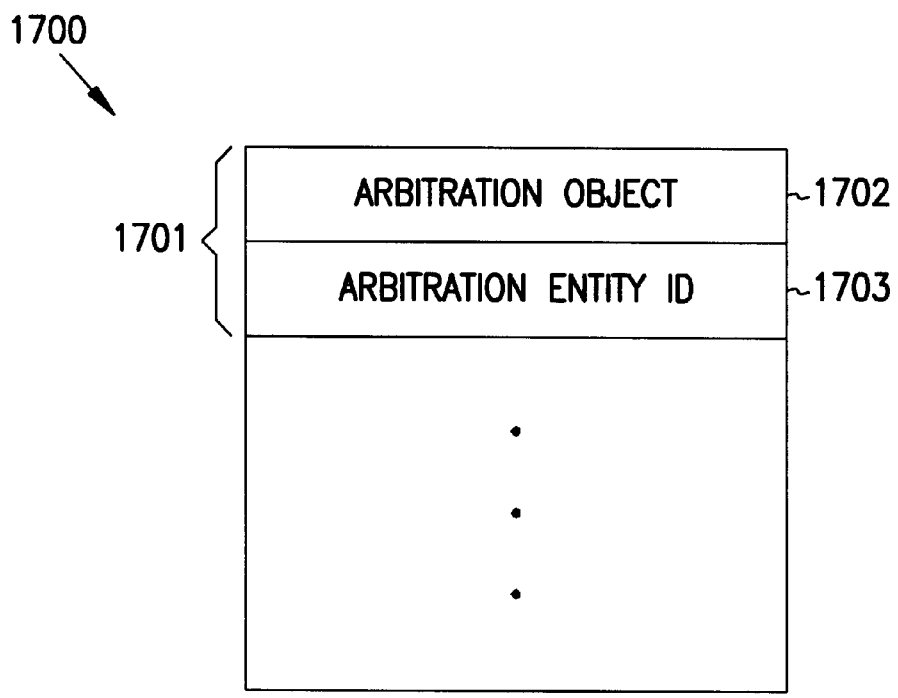
FIG. 17 is a diagram of an arbitration manager data structure for use in an exemplary implementation of the invention.

The exemplary implementation of the ArbitrationManager 1700 illustrated in FIG. 17 maintains a hash table of ArbitrationObjects 1702 in which each entry 1701 is hashed on the identity of the entity being arbitrated 1703. For example, in the case of a record, the object's identity is determined by the table identifier and the primary key for the record. The various messages, proposal, proposal response, and closure, all contain the identity of the object as shown in FIGS. 13–15. The ArbitrationManager looks up the corresponding ArbitrationObject in the hash table. If the associated ArbitrationObject is not found, the Arbitrationanager creates it and adds it to the hash table. The ArbitrationManager then calls the appropriate function to handle the incoming message.

In addition to distributing messages the ArbitrationManager handles the task of starting an arbitration cycle on the local node by providing two functions, Propose and WakeupArbitration. Propose creates a local proposal message and then uses the ArbitrationObject to initiate a proposal as described above with reference to FIG. 4. When Propose returns, the caller can proceed to process the change that was proposed. Upon completion of the change, the caller calls WakeupArbitration, which causes the ArbitrationObject to process the next proposal that is added to the QueueOfArbitratedProposals as described above with reference to FIG. 12.

In this section, a particular implementation of the arbitration process has been described as implemented in Microsoft's In Memory Database system to propagate changes to a cached table throughout the domain of nodes. An ArbitrationObject is used to track an arbitration cycle for a specific table cached on a node and an ArbitrationManager object is used to manage the ArbitrationObjects for the node. Data structures for proposal, proposal response, and closure messages have been detailed. Various lists and queues used to manage the messages sent and received by the node during the arbitration cycle have been described, along with virtual functions that support the arbitration process.

CONCLUSION

An arbitration process has been described that propagates changes to a shared entity throughout the nodes that share the entity. On any given node, the arbitration cycle starts when either the node attempts to change a shared entity (and therefore sends proposals to the other nodes in the domain as an "instigator"), or when the node receives a proposal from a node (and is therefore an "observer"). In any arbitration cycle, the set of proposals that belong to the cycle is computed to be the same on all nodes and only one node is computed to be the winner.

The sequence of messages received on an observer node is as follows:

1. Receive at least one proposal from one other node;
2. Receive any number of proposals from other nodes;
3. Receive a closure message from the winner of the arbitration; and
4. Receive other proposals from instigators of the arbitration.

An instigator node that wins an arbitration sends its proposal before it receives any other proposals. Then:

1. It may receive any number of proposals and proposal responses from other nodes;
2. A proposal belongs to this arbitration cycle if it is received before the proposal response from that node;
3. If a proposal response is received before any proposal from a node, then the node is an observer in the cycle;
4. If a proposal is received before a proposal response from a node we sent our proposal to, then that node is an instigator; and
5. Upon receiving all proposal responses, the winner sends the closure response message and the cycle is complete on the winning node.

An instigator that loses an arbitration differs from the winner in that:

1. It will receive a closure message before or after it receives proposal responses from all other nodes it sent proposals to; and
2. The set of instigators, i.e., nodes from which it received a proposal before a proposal response, matches the set of instigators as computed by the winning node, so that it can determine that it did not win the arbitration even before it receives the closure message from the winner.

Each node receives all proposals from the set of proposals in the cycle prior to the cycle being complete on that node. The arbitration cycle ends when (1) an instigator node that wins the arbitration receives a response from every node that it sent a proposal to, (2) an instigator node that loses the arbitration receives a response from every node that it sent a proposal to and receives a closure notification from the winner, or (3) an observer node receives a closure message from the winner and a proposal from each node mentioned in the closure message. The set of proposals are then applied on each node in the same order.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

For example, those of ordinary skill within the art will appreciate that the arbitration process of the present invention can be used to synchronize changes to any resource that is distributed across multiple nodes in a network when such nodes are operating asynchronously. Furthermore, those of ordinary skill within the art will appreciate that appreciate that the arbitration process serves to propagate such changes properly throughout the multiple nodes, even when only one proposal is active in an arbitration cycle.

Although the invention has been described in part as operating within an object-oriented database environment, the terminology used in this is meant to include any networked environments. Therefore, it is manifestly intended that this invention be limited only by the following claims and equivalents thereof.

We claim:

1. A computerized method for arbitrating changes made to a shared entity in a network having multiple nodes with at least one of the nodes acting as an instigator for an arbitration cycle, the method comprising:

broadcasting, by each instigator node, a proposal message pertaining to the shared entity;

sending, by each node that receives a proposal message, a response to each proposal message to the instigator node that broadcast the proposal message;

receiving, by each instigator node, the responses to the proposal message it broadcast;

determining, by each instigator node, a winning instigator node;

determining, by each node, an order for each proposal message;

broadcasting, by the winning instigator node, a closure message containing a list of instigator nodes in the arbitration cycle; and changing, by each node, the shared entity in accordance with the order for each proposal message broadcast by one of the instigator nodes in the arbitration cycle.

2. The computerized method of claim 1, wherein the elements are performed in the order stated.

3. The computerized method of claim 1, further comprising:

beginning, on each instigator node, the arbitration cycle as a result of broadcasting the proposal message; and terminating, on each instigator node, the arbitration cycle after determining the winning instigator node.

4. The computerized method of claim 1, wherein each instigator node determines the winning instigator node after receiving all proposal messages in the arbitration cycle.

5. The computerized method of claim 1, wherein the closure message specifies the order for each proposal message.

6. The computerized method of claim 1, wherein each node that is not an instigator in the arbitration cycle is an observer and further comprising:

beginning, on each observer node, the arbitration cycle as a result of receiving a proposal message; and terminating, on each observer node, the arbitration cycle upon receiving all proposals in the cycle and receiving the closure message from the winning instigator node.

7. The computerized method of claim 6, wherein each observer node determines the order of the proposal messages after receiving the closure message from the winning instigator node.

8. The computerized method of claim 1, wherein a proposal message designated as expedited is ordered ahead of any proposal message not designated as expedited.

9. A computerized method for arbitrating changes made to a shared entity in a network having multiple nodes on a node acting as an instigator for an arbitration cycle, the method comprising:

broadcasting a proposal message pertaining to the shared entity;

receiving any proposal message pertaining to the shared entity broadcast by another node in the network;

receiving the responses to the proposal message it broadcast;

determining a set of proposal messages belonging to the arbitration cycle, wherein the set of proposal messages includes the proposal message broadcast by the instigator node and all proposal messages received by the instigator node before all responses to the proposal message it broadcast have been received;

determining a winning instigator node for the arbitration cycle and an order for each proposal message in the arbitration cycle;

broadcasting a closure message containing a list of instigator nodes in the arbitration cycle if it is the winning instigator node; and changing the shared entity on the instigator node in accordance with the order for each proposal message in the arbitration cycle.

10. The computerized method of claim 9, wherein the elements are performed in the order stated.

11. The computerized method of claim 9, further comprising:

beginning the arbitration cycle as a result of broadcasting the proposal message; and terminating the arbitration cycle after determining the winning instigator node.

12. The computerized method of claim 9, wherein the closure message contains the order for each proposal message in the arbitration cycle.

13. The computerized method of claim 9, wherein a proposal message designated as expedited is ordered ahead of any proposal message not designated as expedited.

14. A computerized method for arbitrating changes made to a shared entity in a network having multiple nodes on a node acting as an observer for an arbitration cycle, the method comprising:

receiving a proposal message pertaining to the shared entity broadcast by another node in the network;

sending a response to the proposal message to the instigator node that broadcast the proposal message;

receiving a closure message from the instigator node that won the arbitration cycle;

determining a set of proposal messages in the arbitration cycle based on the closure message;

determining an order for the set of proposal messages in the arbitration cycle; and changing the shared entity in accordance with the order for each proposal message in the arbitration cycle.

15. The computerized method of claim 14, wherein the elements are performed in the order stated.

16. The computerized method of claim 14, wherein the closure message specifies the order for each proposal message.

17. The computerized method of claim 14, further comprising:

beginning the arbitration cycle as a result of receiving a proposal message; and terminating the arbitration cycle upon receiving all proposals in the cycle and receiving the closure message from the winning instigator node.

18. The computerized method of claim 14, wherein a proposal message designated as expedited is ordered ahead of any proposal message not designated as expedited.

19. A computer-readable program code carrying medium having a software program stored thereon executable on a computer for performing a method for arbitrating changes made to a shared entity in a network having multiple nodes with at least one of the nodes acting as an instigator for an arbitration cycle, the method comprising:

broadcasting, by each instigator node, a proposal message pertaining to the shared entity;

sending, by each node that receives a proposal message, a response to each proposal message to the instigator node that broadcast the proposal message;

receiving, by each instigator node, the responses to the proposal message it broadcast;

determining, by each instigator node, a winning instigator node;

determining, by each node, an order for each proposal message;

broadcasting, by the winning instigator node, a closure message containing a list of instigator nodes in the arbitration cycle; and changing, by each node, the shared entity in accordance with the order for each proposal message broadcast by one of the instigator nodes in the arbitration cycle.

20. The computer-readable program code carrying medium of claim 19, wherein the elements are performed in the order stated.

21. The computer-readable program code carrying medium of claim 19, wherein the method further comprises:

beginning, on each instigator node, the arbitration cycle as a result of broadcasting the proposal message; and terminating, on each instigator node, the arbitration cycle after determining the winning instigator node.

22. The computer-readable program code carrying medium of claim 19, wherein each instigator node determines the winning instigator node after receiving all proposal messages in the arbitration cycle.

23. The computer-readable program code carrying medium of claim 19, wherein the closure message specifies the order for each proposal message.

24. The computer-readable program code carrying medium of claim 19, wherein each node that is not an instigator in the arbitration cycle is an observer and the method further comprises:

beginning, on each observer node, the arbitration cycle as a result of receiving a proposal message; and terminating, on each observer node, the arbitration cycle upon receiving all proposals in the cycle and receiving the closure message from the winning instigator node.

25. The computer-readable program code carrying medium of claim 24, wherein each observer node determines the order of the proposal messages after receiving the closure message from the winning instigator node.

26. The computer-readable program code carrying medium of claim 19, wherein a proposal message designated as expedited is ordered ahead of any proposal message not desired as expedited.

27. A computer-readable program code carrying medium having a software program stored thereon executable on a computer for performing a method for arbitrating changes made to a shared entity in a network having multiple nodes on a node acting as an instigator for an arbitration cycle, the method comprising:

broadcasting a proposal message pertaining to the shared entity;

receiving any proposal message pertaining to the shared entity broadcast by other node in the network;

receiving the responses to the proposal message it broadcast;

determining a set of proposal messages belonging to the arbitration cycle, wherein the set of proposal messages includes the proposal message broadcast by the instigator node and all proposal messages received by the instigator node before all responses to the proposal message it broadcast have been received;

determining a winning instigator node for the arbitration cycle and an order for each proposal message in the arbitration cycle;

broadcasting a closure message containing a list of instigator nodes in the arbitration cycle if it is the winning instigator node; and changing the shared entity on the instigator node in accordance with the order for each proposal message in the arbitration cycle.

28. The computer-readable program code carrying medium of claim 27, wherein the elements are performed in the order stated.

29. The computer-readable program code carrying medium of claim 27, wherein the method further comprises:

beginning the arbitration cycle as a result of broadcasting the proposal message; and terminating the arbitration cycle after determining the winning instigator node.

30. The computer-readable program code carrying medium of claim 27, wherein the closure message contains the order for each proposal message in the arbitration cycle.

31. The computer-readable program code carrying medium of claim 27, wherein a proposal message designated as expedited is ordered ahead of any proposal message not designated as expedited.

32. A computer-readable program code carrying medium having a software program stored thereon executable on a computer for performing a method for arbitrating changes made to a shared entity in a network having multiple nodes on a node acting as an observer for an arbitration cycle, the method comprising:

receiving a proposal message pertaining to the shared entity broadcast by another node in the network;

sending a response to the proposal message to the instigator node that broadcast the proposal message;

receiving a closure message from the instigator node that won the arbitration cycle;

determining a set of proposal messages in the arbitration cycle based on the closure message;

determining an order for the set of proposal messages in the arbitration cycle; and changing the shared entity in accordance with the order for each proposal message in the arbitration cycle.

33. The computer-readable program code carrying medium of claim 32, wherein the elements are performed in the order stated.

34. The computer-readable program code carrying medium of claim 32, wherein the closure message specifies the order for each proposal message.

35. The computer-readable program code carrying medium of claim 32, wherein the method further comprises:

beginning the arbitration cycle as a result of receiving a proposal message; and terminating the arbitration cycle upon receiving all proposals in the cycle and receiving the closure message from the winning instigator node.

36. The computer-readable program code carrying medium of claim 32, wherein a proposal message designated as expedited is ordered ahead of any proposal message not designated as expedited.

37. A computer system for arbitrating changes made to a shared entity in a network having multiple nodes with at least one of the nodes acting as an instigator for an arbitration cycle, the system comprising:

means for broadcasting, by each instigator node, a proposal message pertaining to the shared entity;

means for sending, by each node that receives a proposal message, a response to each proposal message to the instigator node that broadcast the proposal message;

means for receiving, by each instigator node, the responses to the proposal message it broadcast;

means for determining, by each instigator node, a winning instigator node;

means for determining, by each node, an order for each proposal message;

means for broadcasting, by the winning instigator node, a closure message containing a list of instigator nodes in the arbitration cycle; and means for changing, by each node, the shared entity in accordance with the order for each proposal message broadcast by one of the instigator nodes in the arbitration cycle.

38. The computer system of claim 37, wherein the elements are performed in the order stated.

39. The computer system of claim 37, further comprising:

means for beginning, on each instigator node, the arbitration cycle as a result of broadcasting the proposal message; and means for terminating, on each instigator node, the arbitration cycle after determining the winning instigator node.

40. The computer system of claim 37, wherein each instigator node determines the winning instigator node after receiving all proposal messages in the arbitration cycle.

41. The computer system of claim 37, wherein the closure message specifies the order for each proposal message.

42. The computer system of claim 37, wherein each node that is not an instigator in the arbitration cycle is an observer and the system further comprising:

means for beginning, on each observer node, the arbitration cycle as a result of receiving a proposal message; and means for terminating, on each observer node, the arbitration cycle upon receiving all proposals in the cycle and receiving the closure message from the winning instigator node.

43. The computer system of claim 42, wherein each observer node determines the order of the proposal messages after receiving the closure message from the winning instigator node.

44. The computer system of claim 37, wherein a proposal message designated as expedited is ordered ahead of any proposal message not desired as expedited.

45. A computer system for arbitrating changes made to a shared entity in a network having multiple nodes on a node acting as an instigator for an arbitration cycle, the system comprising:

means for broadcasting a proposal message pertaining to the shared entity;

means for receiving any proposal message pertaining to the shared entity broadcast by other node in the network;

means for receiving the responses to the proposal message it broadcast;

means for determining a set of proposal messages belonging to the arbitration cycle, wherein the set of proposal messages includes the proposal message broadcast by the instigator node and all proposal messages received by the instigator node before all responses to the proposal message it broadcast have been received;

means for determining a winning instigator node for the arbitration cycle and an order for each proposal message in the arbitration cycle;

means for broadcasting a closure message containing a list of instigator nodes in the arbitration cycle if it is the winning instigator node; and means for changing the shared entity on the instigator node in accordance with the order for each proposal message in the arbitration cycle.

46. The computer system of claim 45, wherein the elements are performed in the order stated.

47. The computer system of claim 45, wherein the system further comprises:

means for beginning the arbitration cycle as a result of broadcasting the proposal message; and means for terminating the arbitration cycle after determining the winning instigator node.

48. The computer system of claim 45, wherein the closure message contains the order for each proposal message in the arbitration cycle.

49. The computer system of claim 45, wherein a proposal message designated as expedited is ordered ahead of any proposal message not designated as expedited.

50. A computer system for arbitrating changes made to a shared entity in a network having multiple nodes on a node acting as an observer for an arbitration cycle, the system comprising:

means for receiving a proposal message pertaining to the shared entity broadcast by another node in the network;

means for sending a response to the proposal message to the instigator node that broadcast the proposal message;

means for receiving a closure message from the instigator node that won the arbitration cycle;

means for determining a set of proposal messages in the arbitration cycle based on the closure message;

means for determining an order for the set of proposal messages in the arbitration cycle; and means for changing the shared entity in accordance with the order for each proposal message in the arbitration cycle.

51. The computer system of claim 50, wherein the elements are performed in the order stated.

52. The computer system of claim 50, wherein the closure message specifies the order for each proposal message.

53. The computer system of claim 50, wherein the system further comprises:

means for beginning the arbitration cycle as a result of receiving a proposal message; and means for terminating the arbitration cycle upon receiving all proposals in the cycle and receiving the closure message from the winning instigator node.

54. The computer system of claim 50, wherein a proposal message designated as expedited is ordered ahead of any proposal message not designated as expedited.

\* \* \* \* \*